(12) United States Patent
Bharti et al.

(10) Patent No.: US 11,866,633 B2
(45) Date of Patent: Jan. 9, 2024

(54) LIGNIN COMPOSITION, METHODS OF MAKING AND USING THE COMPOSITION FOR ADSORPTION ONTO PETROCHEMICAL OIL AND OIL REMOVAL

(71) Applicant: Bhuvnesh Bharti, Baton Rouge, LA (US)

(72) Inventors: Bhuvnesh Bharti, Baton Rouge, LA (US); Jin Gyun Lee, Baton Rouge, LA (US)

(73) Assignee: BOARD OF SUPERVISORS OF LOUISIANA STATE UNIVERSITY AND AGRICULTURAL AND MECHANICAL COLLEGE, Baton Rouge, LA (US)

(*) Notice: Subject to any disclaimer, the term of this patent is extended or adjusted under 35 U.S.C. 154(b) by 257 days.

(21) Appl. No.: 17/282,048

(22) PCT Filed: Oct. 3, 2019

(86) PCT No.: PCT/US2019/054430
§ 371 (c)(1),
(2) Date: Apr. 1, 2021

(87) PCT Pub. No.: WO2020/072735
PCT Pub. Date: Apr. 9, 2020

(65) Prior Publication Data
US 2021/0340420 A1 Nov. 4, 2021

Related U.S. Application Data

(60) Provisional application No. 62/741,049, filed on Oct. 4, 2018.

(51) Int. Cl.
*C09K 3/32* (2006.01)
*B01D 17/02* (2006.01)
(Continued)

(52) U.S. Cl.
CPC ............ *C09K 3/32* (2013.01); *B01D 17/0202* (2013.01); *B01J 20/24* (2013.01); *C02F 1/286* (2013.01);
(Continued)

(58) Field of Classification Search
CPC ........ C09K 3/32; B01D 17/0202; B01J 20/24; B01J 2220/4837; C02F 1/286;
(Continued)

(56) References Cited

U.S. PATENT DOCUMENTS 4,713,185 A 12/1987 Howard
5,095,986 A 3/1992 Naae
(Continued)

OTHER PUBLICATIONS

Lee et. al. Binding of Lignin Nanoparticles at Oil-Water Interfaces: An Ecofriendly Alternative to Oil Spill Recovery. ACS Appl. Mater. Interfaces 2018, 10, 43282-43289. (Year: 2018).*
(Continued)

*Primary Examiner* — Liam Royce
(74) *Attorney, Agent, or Firm* — Riverside Law LLP

(57) ABSTRACT

The present invention relates in part to a lignin composition and a method of fabricating a lignin composition. The invention also relates in part to a method of using a lignin composition to adsorb onto a petrochemical oil comprising the steps of providing a solution of lignin in an alcohol, providing an oil on a liquid surface, contacting the oil with the solution of lignin in an alcohol, adsorbing the lignin to the oil, and removing the adsorbed oil from the surface of the liquid.

9 Claims, 23 Drawing Sheets

(51) Int. Cl.
*C02F 1/28* (2023.01)
*C02F 1/68* (2023.01)
*C08L 97/00* (2006.01)
*B01J 20/24* (2006.01)
*C02F 101/32* (2006.01)

(52) U.S. Cl.
CPC ............ *C02F 1/681* (2013.01); *C08L 97/005* (2013.01); *B01J 2220/4837* (2013.01); *C02F 2101/32* (2013.01); *C02F 2305/04* (2013.01); *C02F 2305/08* (2013.01)

(58) Field of Classification Search
CPC .. C02F 1/681; C02F 2101/32; C02F 2305/04; C02F 2305/08; C08L 97/005
See application file for complete search history.

(56) References Cited

U.S. PATENT DOCUMENTS

| | | | |
|---|---|---|---|
| 5,114,599 | A | 5/1992 | Debons |
| 5,911,276 | A | 6/1999 | Kieke |
| 8,647,512 | B2 | 2/2014 | Viswanathan |
| 2011/0308810 | A1 | 12/2011 | Stokes |
| 2013/0126435 | A1 | 5/2013 | Berlin |
| 2014/0288285 | A1* | 9/2014 | Ters .................. C08H 6/00 530/500 |
| 2015/0368541 | A1 | 12/2015 | Monclin |

OTHER PUBLICATIONS

Al-Jammal et. al. 2016.Review on the effectiveness of adsorbent materials in oil spills clean up. 7th International Conference of ICEEE, Nov. 17-19 2016, Budapest, Hungary. (Year: 2016).*
Bai et. al.. Adsorption and Assembly of Cellulosic and Lignin Colloids at Oil/Water Interfaces (Year: 2018).*
Alkenylsuccinic anhydrides. Aug. 18, 2018 (Wikipedia) 7 pagegs.
Bizmark, N., Ioannidis, M. A., & Henneke, D. E. (2014). Irreversible Adsorption-Driven Assembly of Nanoparticles at Fluid Interfaces Revealed by a Dynamic Surface Tension Probe. Langmuir, 30(3), 710-717.
Doshi, B., Sillanpää, M., & Kalliola, S. (2018). A review of bio-based materials for oil spill treatment. Water Research, 135, 262-277. doi:10.1016/j.watres.2018.02.034.
Lam, S. et al., Curr. Opin. Colloid Interface Sci., 2014, 19:490-500.
Richter, A. P., Bharti, B., Armstrong, H. B., Brown, J. S., Plemmons, D., Paunov, V. N., . . . Velev, O. D. (2016). Synthesis and Characterization of Biodegradable Lignin Nanoparticles with Tunable Surface Properties. Langmuir, 32(25), 6468-6477.
Shahi, Ankur, Kraft lignin: a novel alternative to oil spill cleanup recycling industrial waste, Canadian Young Scientist Journal, vol. 7, No. 3, 42-46 (2014).
Zhang, Y., Wang, S., Zhou, J., Zhao, R., Benz, G., Tcheimou, S., . . Behrens, S. H. (2017). Interfacial Activity of Nonamphiphilic Particles in Fluid-Fluid Interfaces. Langmuir, 33(18), 4511-4519.

* cited by examiner

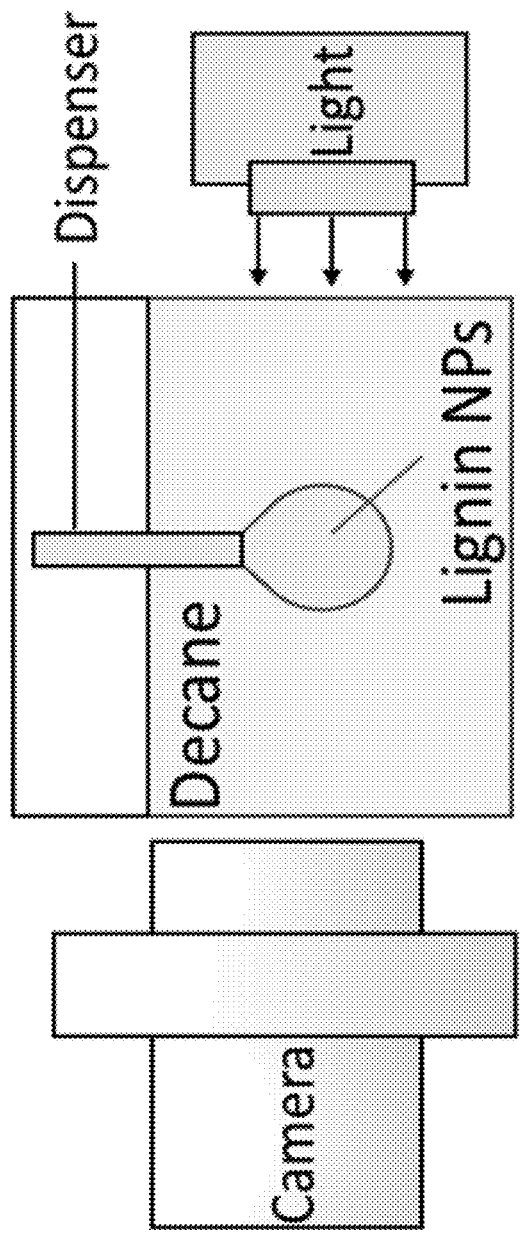
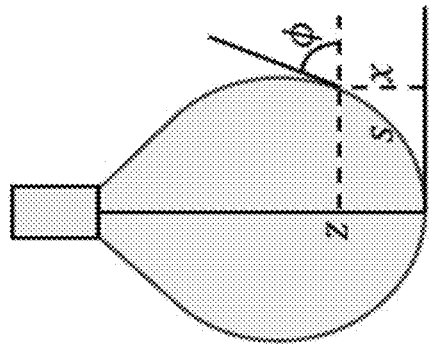
Figure 5A
Figure 5B

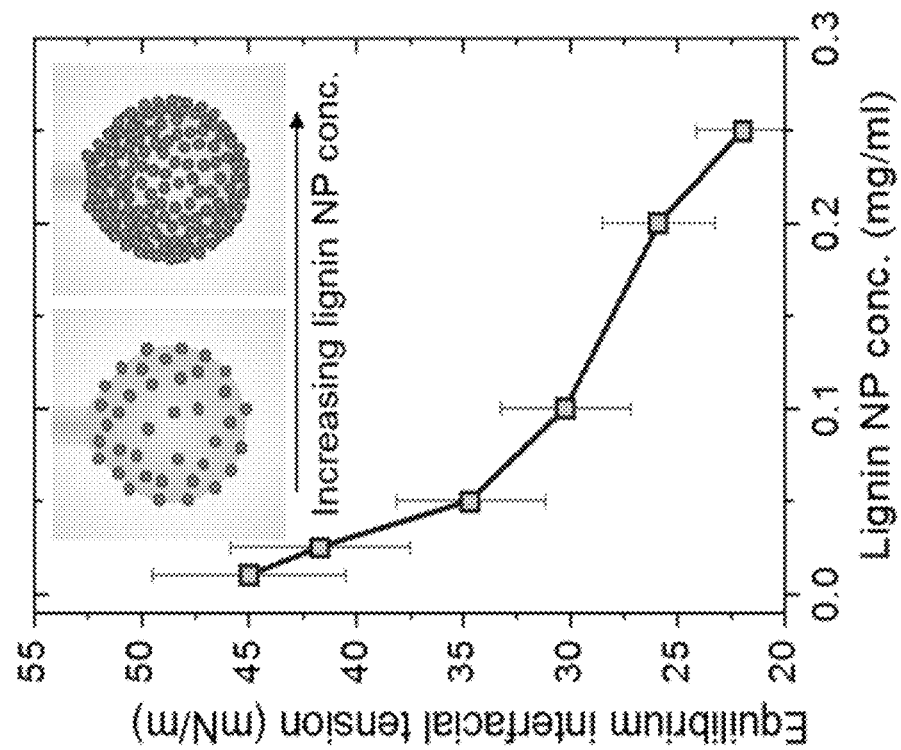
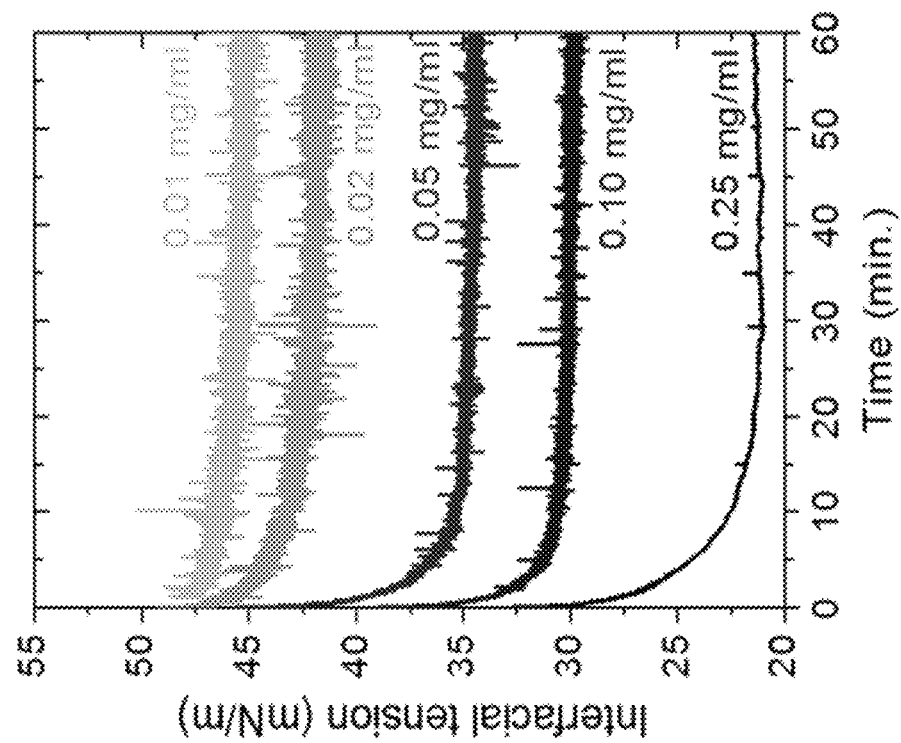

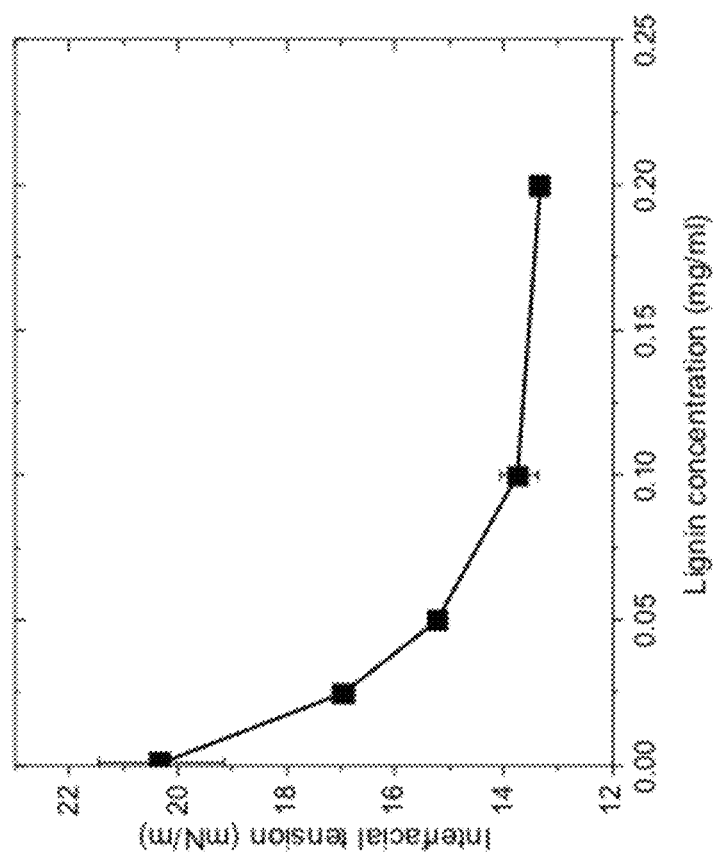
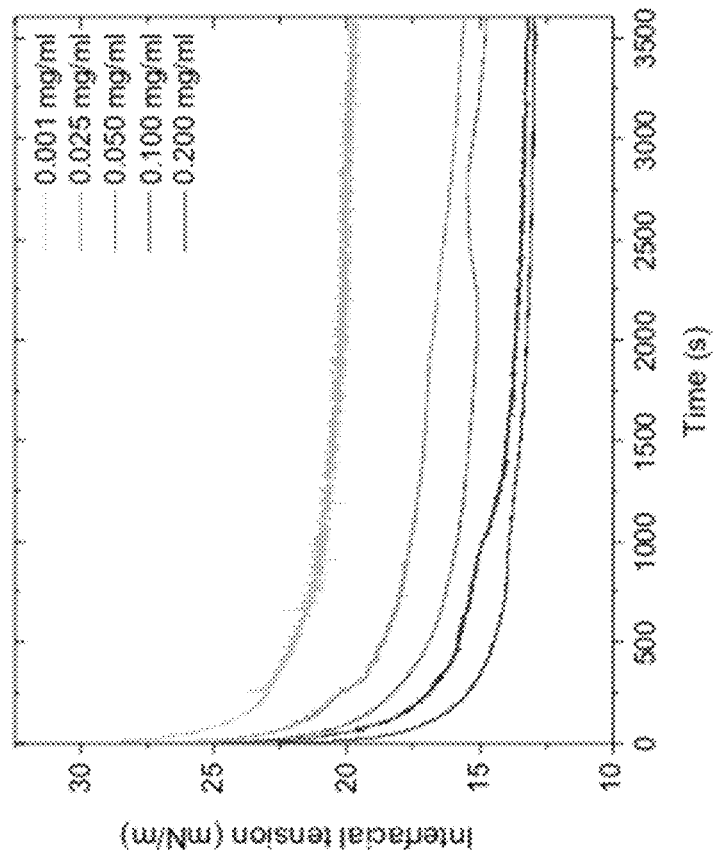
Figure 13A
Figure 13B

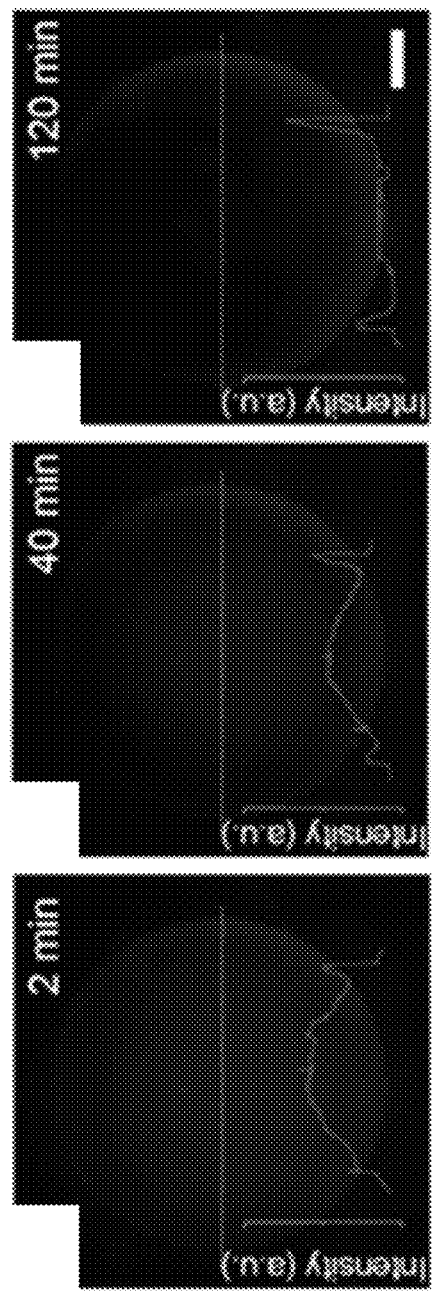
Figure 14B
Figure 14A
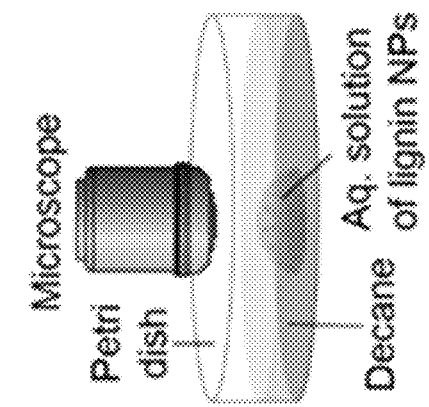

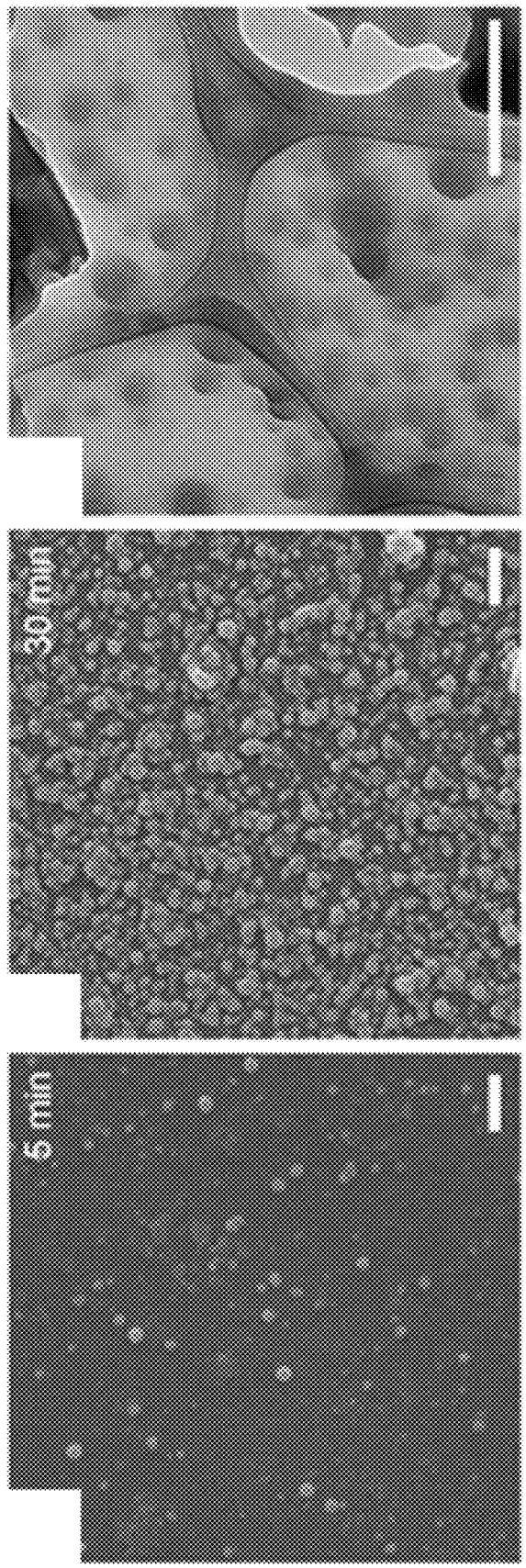

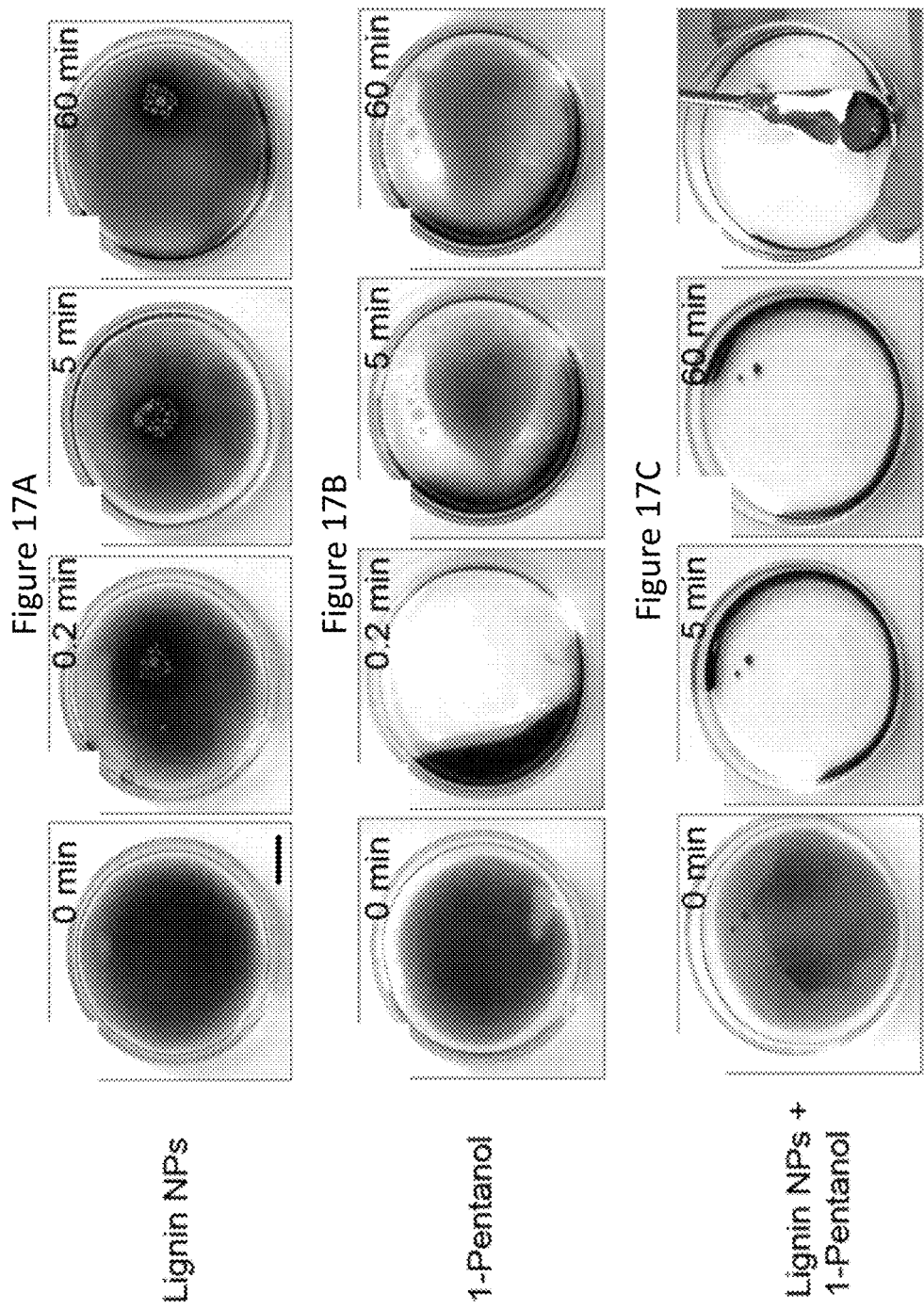

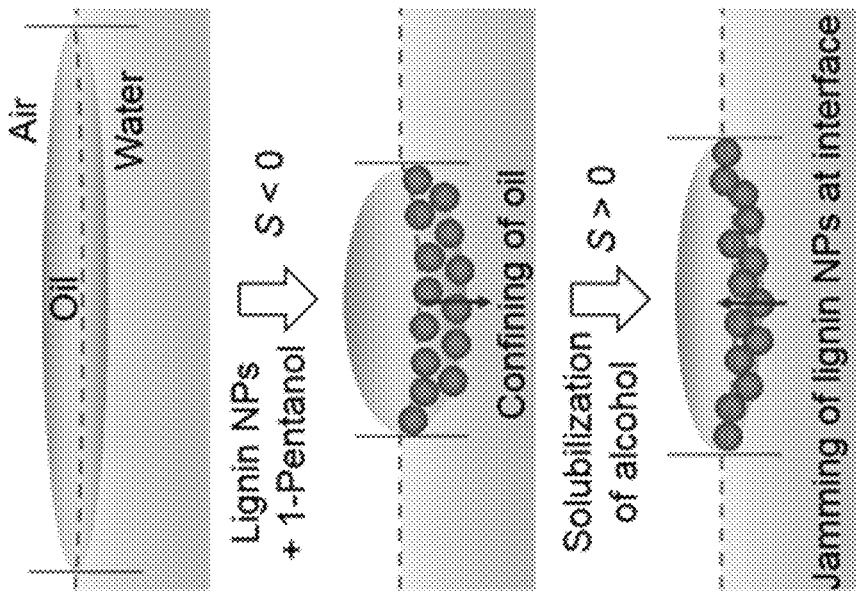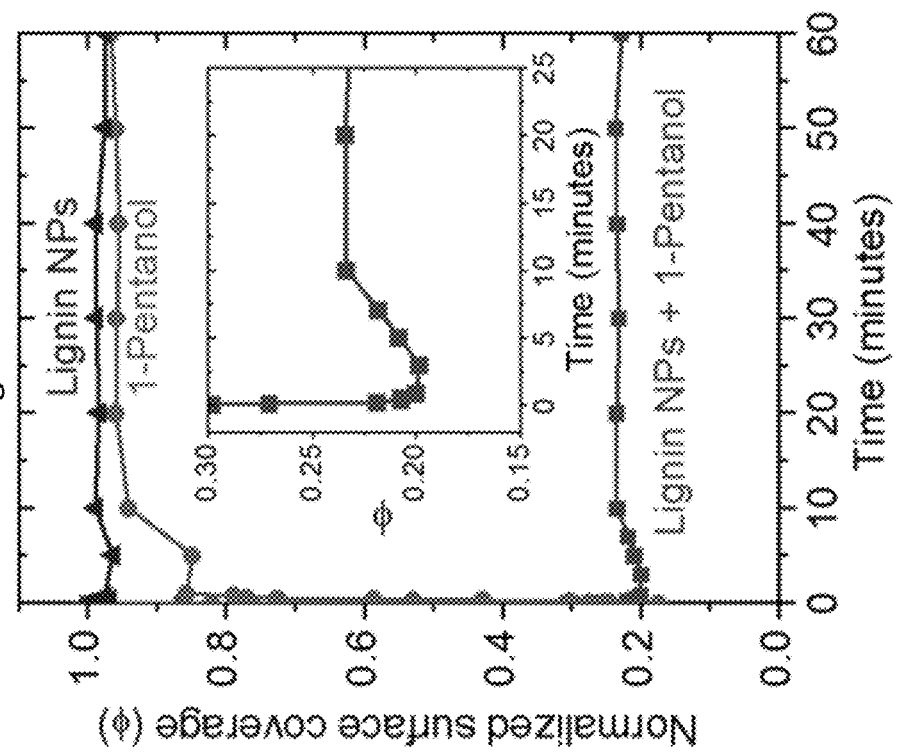

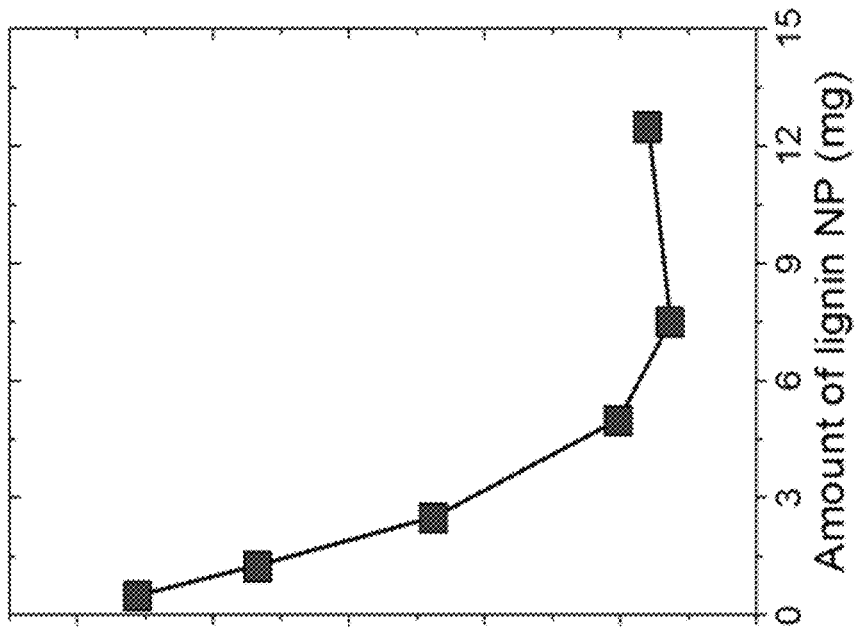
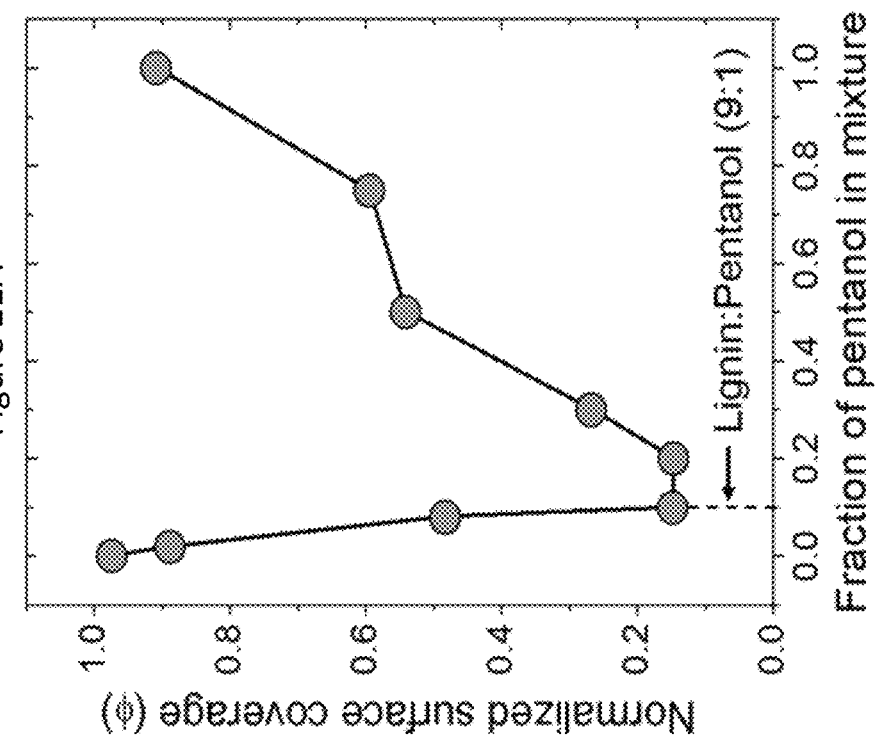

LIGNIN COMPOSITION, METHODS OF MAKING AND USING THE COMPOSITION FOR ADSORPTION ONTO PETROCHEMICAL OIL AND OIL REMOVAL

CROSS-REFERENCE TO RELATED APPLICATIONS

The present application is a 35 U.S.C. § 371 national phase application from, and claiming priority to, International Application No. PCT/US2019/054430, filed Oct. 3, 2019, which claims priority under 35 U.S.C. § 119(e) to U.S. Provisional Application No. 62/741,049, filed Oct. 4, 2018, all of which are hereby incorporated by reference in their entireties.

BACKGROUND OF THE INVENTION

Adsorption of molecules and nanoparticles (NPs) at liquid-liquid interfaces plays a critical role in emulsion/foam stabilization, targeted delivery in biomedicine and synthesis of functional materials (Jian, G. et al., Langmuir, 2016, 32:10244-10252; Chevigny, C. et al., Carbohydr. Polym., 2016, 146:411-419). Recent advancements in synthetic chemistry have enabled the development of molecules with on-demand interfacial adsorption-desorption abilities (Binks, B. P. et al, Langmuir, 2017, 33:6947-6963). One area where this ability plays a key role is the management of large-scale oil spills (Doshi, B. et al., Water Res., 2018, 135:262-277; Owoseni, O. et al., Langmuir, 2014, 30:13533-13541). Synthetic molecules allow managing oil spills by either dispersing spilled oil in water, gelling the oil, or confining the oil into thick slicks which enables physical collection or in-situ burning (Somasundaran, P. et al., Oil Spill Remediation: Colloid Chemistry-Based Principles and Solutions, 1st ed.; John Wiley & Sons: Hoboken, New Jersey, 2014).

The strategy where an oil slick is burned using a controlled combustion is known as in-situ burning. In-situ burning eliminates the need for storage and disposal of the oil and has several advantages including a high oil elimination rate (0.171 $m^3/hr \cdot m^2$), high efficiency of oil removal (90-95%), and low cost (Mullin et al., Spill Sci. and Tech. Bull., 2003, 8: 323-330). The thickness of the oil should be around 3 mm to use this strategy.

The strategy wherein oil is confined into thick slicks is also known as "oil-herding". A good oil-herder should reduce the oil-water interfacial tension, form a thin layer on the water surface, have long term stability and be biodegradable. Oil-herding requires the addition of engineered nanomaterials to alter air-water-oil interfacial tensions (Venkataraman, P. et al., ACS Appl. Mater. Interfaces, 2013, 5:3572-3580; Gupta, D. et al., Sci. Adv., 2015, 1:e1400265-e0400265). Currently, silicone-based surfactants are commercially used as oil-herders (Pelletier, É. Et al., Environ. Toxicol. Chem., 1999, 18:813-818). However, their persistent design and poor biodegradability have raised concerns over their release into the environment (Gupta, D. et al., Sci. Adv., 2015, 1:e1400265-e1400265; Prince, R. C., Environ. Sci. Technol., 2015, 49:6376-6384). Hence, there is a need to develop new ecofriendly alternatives to currently used harsh chemical oil-herders (Paul, J. H. et al., Environ. Sci. Technol., 2013, 47:9651-9659).

There is a need in the art for new compositions that can adsorb oil. The present invention satisfies this unmet need.

SUMMARY OF THE INVENTION

In one embodiment, the present invention relates to a method of adsorbing lignin onto a petrochemical oil, the method comprising: providing a solution of lignin in an alcohol; providing an oil on a liquid surface; contacting the oil with the solution of lignin in an alcohol; adsorbing the lignin to the oil; and removing the adsorbed oil from the liquid surface. In one embodiment, the lignin is a lignin nanoparticle. In one embodiment, the lignin nanoparticle has an average diameter between 35 nm and 260 nm. In one embodiment, the step of contacting the oil with a solution of lignin in an alcohol further comprises contacting the oil with an additional additive selected from the group consisting of: bioremediation agents, dispersants, surface collecting agents, and surface washing agents. In one embodiment, the step of contacting the oil with a solution of lignin in an alcohol further comprises the step of decreasing the interfacial tension between the liquid surface and the solution of lignin in an alcohol. In one embodiment, the liquid is selected from the group consisting of: freshwater, salt water, distilled water, deionized water, and brackish water. In one embodiment, the alcohol is selected from the group consisting of: n-butanol, sec-butanol, isobutanol, tert-butanol, 1-pentanol, 2-pentanol, 3-pentanol, 2-methyl-1-butanol, 3-methyl-1-butanol, 3-methyl-2-butanol, 2,2-dimethyl-1-propanol, 1-hexanol, 2-hexanol, 3-hexanol, 2-methylpentan-1-ol, 3-methylpentan-1-ol, 4-methylpentan-1-ol, 2-methylpentan-2-ol, 3-methylpentan-2-ol, 4-methylpentan-2-ol, 2-methylpentan-3-ol, 3-methylpentan-3-ol, 2,2-dimethylbutan-1-ol, 2,3-dimethylbutan-1-ol, 3,3-dimethylbutan-1-ol, 2,3-dimethylbutan-2-ol, 3,3-dimethylbutan-2-ol, 2-ethylbutan-1-ol, 1-octanol, 2-octanol, 2-ethylhexanol, and combinations thereof. In one embodiment, the petrochemical oil is selected from the group consisting of: fuel oil, crude oil, kerosene, gasoline, and combinations thereof. In one embodiment, the concentration of lignin in an alcohol is between 0.2 mg/ml and 0.3 mg/ml. In one embodiment, the step of adsorbing the lignin onto the oil takes between 0 minutes and 2 hours.

BRIEF DESCRIPTION OF THE DRAWINGS

The following detailed description of various embodiments of the invention will be better understood when read in conjunction with the appended drawings. For the purpose of illustrating the invention, there are shown in the drawings illustrative embodiments. It should be understood, however, that the invention is not limited to the precise arrangements and instrumentalities of the embodiments shown in the drawings.

FIG. 3, comprising FIG. 3A depicts low polydispersity in particle dispersion based on the smooth and single exponential decay of correlation function. FIG. 3B depicts an intensity distribution of particle sizes, obtained using dynamic light scattering (DLS), showing that the average particle diameter is ~100 nm. FIG. 3C depicts a transmission electron microscope image of lignin nanoparticles indicating that the predominant shape of particles is spherical, and the average diameter is ~100 nm which agrees with DLS particle diameter distribution. Scale=10 nm.

FIG. 5, comprising FIG. 5A and FIG. 5B, depicts schematics of the optical tensiometry measurements. FIG. 5A depicts an optical tensiometry measurement where a pendant drop of lignin NP dispersion was introduced in the cuvette with decane, and drop was recorded with the high-speed camera. FIG. 5B depicts a schematic of how the interfacial tension is measured from a pendant drop of decane-lignin nanoparticles wherein s is the arc length from the apex to the point where a tangent inclined at an angle φ (with respect to horizontal) intersects the periphery of the droplet, and x and y are the coordinates of the point of intersection of the droplet-periphery and the tangent.

FIG. 6, comprising FIG. 6A depicts a schematic representation of the solvent depletion method used to obtain adsorption isotherm. FIG. 6B depicts an experimentally determined adsorption isotherm of the NPs onto a decane-water interface and the corresponding fit. The circles are the experimental values and the line represents the best fit to the data using the Frumkin adsorption isotherm model. The adsorption isotherm shows the formation of a sub-monolayer of lignin NPs at the oil-water interface, with maximum nanoparticle fractional surface coverage of ~0.6-0.7. The symbol # represents the number of lignin NPs.

FIG. 7, comprising FIG. 7A depicts an image of a drop lignin NPs in decane. Scale bar=0.5 mm. FIG. 7B depicts an image of a drop of lignin NPs in decane showing deflation of volume. FIG. 7C depicts the drop after deflation showing wrinkles on the surface. Bending energy is estimated by the shape and wrinkle analysis of the drop wherein $L_w$ is the length of the wrinkles and $\Lambda$ is a wrinkle wavelength.

FIG. 10, comprising FIG. 10A and FIG. 10B, depicts changes in interfacial tension with respect to time or lignin NP concentration. FIG. 10A depicts a decrease in decane-water interfacial tension with time at increasing lignin NP concentration. The interfacial tension decreases rapidly within initial few minutes and attains an equilibrium after 20 min. The numbers adjacent to the curves indicate concentration of lignin NPs in aqueous phase. FIG. 10B depicts the change in the equilibrium interfacial tension of a decane-water interface as a function of increasing lignin NP concentration from 0.01 mg/ml to 0.25 mg/ml. The decrease in interfacial tension is the result of higher interfacial excess of the lignin NPs upon increasing bulk concentration as shown in the inset-schematic.

FIG. 13, comprising FIG. 13A and FIG. 13B, depicts the change in interfacial tension at a crude oil-water interface comprising NaCl. FIG. 13A depicts the decrease in crude oil-water interfacial tension with time at increasing lignin NP concentration. The measurements were performed at 0.4 M NaCl solution which is typical salinity of seawater. The change of interfacial tension of crude oil-water shows a similar behavior as for model decane-water interface (FIG. 10A-B). The equilibrium value of interfacial tension at low concentration of lignin NP (0.001 mg/ml) is achieved at shorter times in the presence of the 1:1 NaCl electrolyte. This faster adsorption is attributed to decrease in electrostatic repulsion between in the negatively charged interface and the particles.

FIG. 14, comprising FIG. 14A, FIG. 14B, FIG. 14C, FIG. 14D, FIG. 14A depicts a schematic of the experimental setup used for fluorescence imaging of a droplet of lignin NPs in decane. FIG. 14B depicts fluorescence micrographs of a droplet of 0.2 mg/ml lignin NPs labelled with Nile red dye. The insets show fluorescence intensity distribution along the straight line passing through center of the droplet. The decrease in relative fluorescence intensity at the center and increase at the edge highlights the depletion of labelled lignin NPs from droplet bulk and formation of a layer of nanoparticles at the decane-water interface. Scale bar=500 μm. FIG. 14C depicts SEM images of the oil-water interface after 5 and 30 minutes of equilibration with lignin NP solution. The increased number density of the particles highlights an increased adsorption of lignin NPs at the oil-water interface. Scale bar=500 nm. FIG. 14D depicts a TEM image of the lignin NP layer formed at decane-water interface. Scale bar=500 nm. FIG. 14E depicts images of a pendant drop of aqueous solution of 0.2 mg/ml lignin NPs in decane. The curvature of the drop changes significantly after equilibration. Film formation is observed after 5 minutes equilibration by deflating the pendent drop and compressing the film. Scale bar=1 mm.

FIG. 17, comprising FIG. 17A, FIG. 17B, and FIG. 17C, depicts a sequence of time-elapsed photographs showing the oil herding effect by only lignin NP solution, 9:1 mixture of water and 1-pentanol, and 9:1 mixture of lignin NPs and 1-pentanol. FIG. 17A depicts that only lignin NPs dispersed in water show no change in the surface area occupied by spilled crude oil. Scale bar=1 cm. FIG. 17B depicts that a 9:1 mixture of water and 1-pentanol shows an initial reduction in the surface area by crude oil. This reduction is attributed to the lower surface tension of 1-pentanol, which facilitates Marangoni flow to confine crude oil. However, upon the solubilization of 1-pentanol after initial few minutes, the oil respreads on the surface of water. FIG. 17C depicts the crude oil herding process by the 9:1 mixture of 0.25 mg/ml lignin NPs and 1-pentanol. The equilibrium herded state is achieved within 5 s, and retained for several hours. The confined oil is safely isolated from the water surface with a spatula.

FIG. 18, comprising FIG. 18A and FIG. 18B, depicts crude oil-herding studies. FIG. 18A depicts the change in the surface area occupied by crude oil upon the addition of mixture of water and 1-pentanol, only lignin NPs, and a mixture of 1-pentanol and lignin NPs. The data is extracted from image analysis of the experiments shown in FIG. 17A-C. The experiments show a small increase in the surface area of the crude oil (inset) after initial few minutes of addition of lignin NP-pentanol mixture to the herded oil. FIG. 18B depicts a schematic representation of the oil herding process. The solubilization of pentanol after first few minutes drives a small increase in the surface area of the oil. This increase drives a jamming of the particles at the interface. The red arrows represent the direction of movement of the interface.

FIG. 21, comprising FIG. 21A and FIG. 21B, depicts the surface area occupied by oil upon addition of a mixture of lignin NP and pentanol. FIG. 21A depicts the change in equilibrium surface coverage of the crude oil upon increasing the fraction of pentanol in the herder mixture. FIG. 21B depicts the decrease in equilibrium surface area occupied by oil upon addition of lignin NP-pentanol mixture containing increasing amounts of lignin. The experiments are performed at a fixed amount of crude oil, and only the amount of lignin NPs is varied.

DETAILED DESCRIPTION

Figure 1:
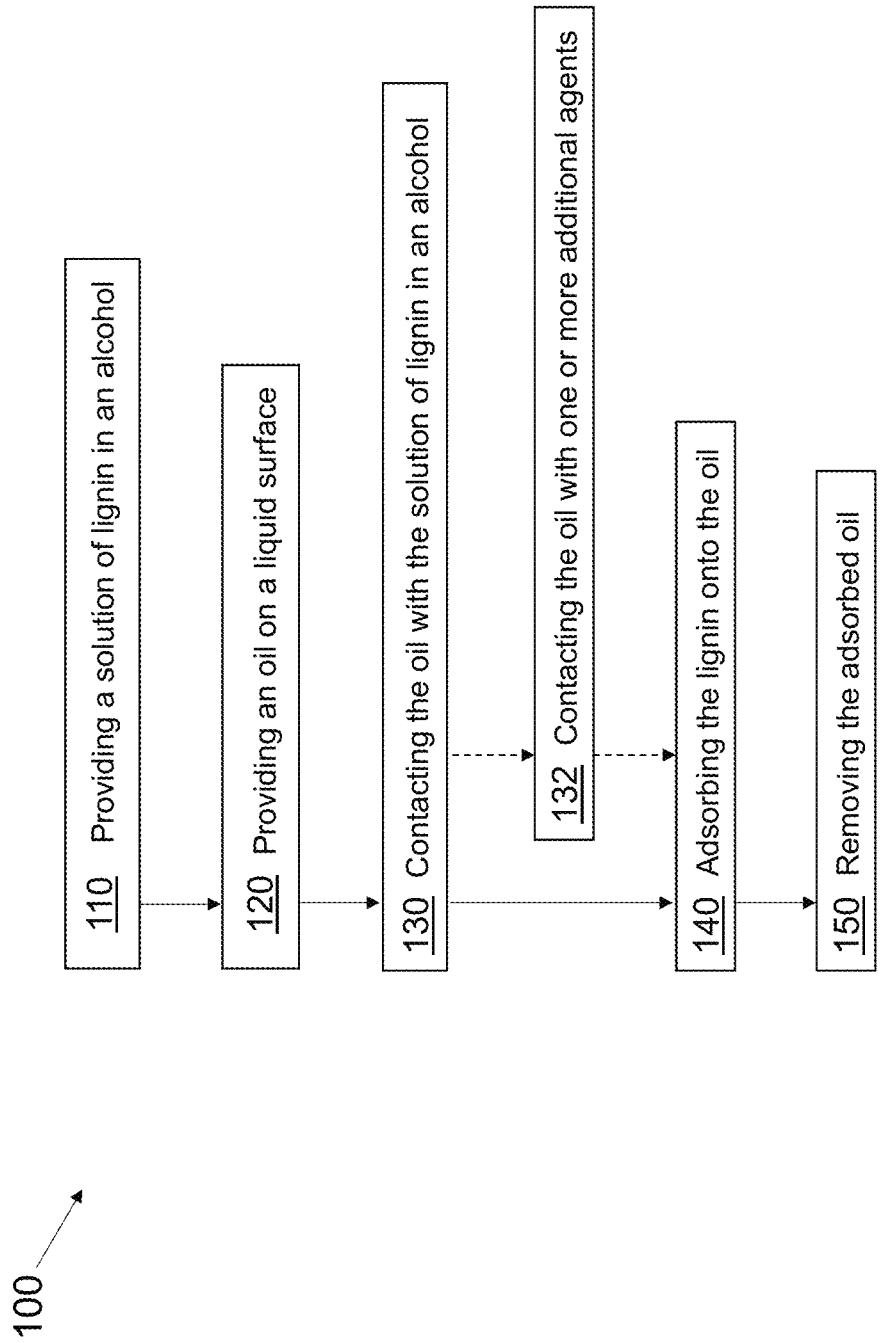
FIG. 1 is a flowchart depicting a method for removing a petrochemical oil by adsorbing lignin onto the petrochemical oil.

It is to be understood that the Figures and descriptions of the present invention have been simplified to illustrate elements that are relevant for a clear understanding of the present invention, while eliminating, for the purpose of clarity, many other elements found in lignin compositions as well as methods of making and using such materials. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

As used herein, each of the following terms has the meaning associated with it in this section. Unless defined otherwise, all technical and scientific terms used herein generally have the same meaning as commonly understood by one of ordinary skill in the art to which this invention belongs.

The articles "a" and "an" are used herein to refer to one or to more than one (i.e. to at least one) of the grammatical object of the article. By way of example, "an element" means one element or more than one element.

As used herein, the term "about" will be understood by persons of ordinary skill in the art and will vary to some extent depending on the context in which it is used. As used herein when referring to a measurable value such as an amount, a temporal duration, and the like, the term "about" is meant to encompass variations of ±20% or ±10%, more preferably ±5%, even more preferably ±1%, and still more preferably ±0.1% from the specified value, as such variations are appropriate to perform the disclosed methods.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Description

In one aspect, the invention relates to a lignin composition comprising an alcohol. In a second aspect, the present invention relates to method of adsorbing a petrochemical oil or a distillate/component of a petrochemical oil using the lignin composition. In another aspect, the present invention relates to a method of making the lignin composition.

Lignin Composition

In one aspect, the present invention relates to a lignin composition. The lignin can be obtained from any commercially available source. In one embodiment, the lignin is obtained from wood or agricultural sources. In one embodiment, the lignin is obtained from an industrial mill such as a pulp mill, a paper mill, or a sugar cane mill. In one embodiment, the lignin is obtained from a papermaking process. In one embodiment, the lignin is obtained from the Kraft pulping process. In one embodiment, the lignin is obtained as a by-product from the conversion of cellulosic biomass to ethanol. In one embodiment, the lignin is high-purity lignin.

In one embodiment, the lignin is in the form of a nanoparticle. In one embodiment, the average diameter of the nanoparticle is between 1 nm and 1000 nm. In one embodiment, the average diameter of the nanoparticle is between 1 nm and 900 nm. In one embodiment, the average diameter of the nanoparticle is between 1 nm and 800 nm. In one embodiment, the average diameter of the nanoparticle is between 1 nm and 700 nm. In one embodiment, the average diameter of the nanoparticle is between 1 nm and 600 nm. In one embodiment, the average diameter of the nanoparticle is between 1 nm and 500 nm. In one embodiment, the average diameter of the nanoparticle is between 1 nm and 400 nm. In one embodiment, the average diameter of the nanoparticle is between 1 nm and 300 nm. In one embodiment, the average diameter of the nanoparticle is between 25 nm and 300 nm. In one embodiment, the average diameter of the nanoparticle is between 35 nm and 275 nm. In one embodiment, the average diameter of the nanoparticle is between 35 nm and 260 nm.

In one embodiment, the lignin nanoparticles are spherical. In one embodiment, the nanoparticles are non-spherical. In one embodiment, the nanoparticles have a smooth surface. In one embodiment, the nanoparticles have a rough surface.

In one embodiment, the lignin nanoparticle has a zeta-potential, at a pH of 7, between 0 mV and −80 mV. In one embodiment, the lignin nanoparticle has a zeta-potential, at a pH of 7, between 0 mV and −70 mV. In one embodiment, the lignin nanoparticle has a zeta-potential, at a pH of 7, between 0 mV and −60 mV. In one embodiment, the lignin nanoparticle has a zeta-potential, at a pH of 7, between 0 mV and −50 mV. In one embodiment, the lignin nanoparticle has a zeta-potential, at a pH of 7, between −10 mV and −50 mV. In one embodiment, the lignin nanoparticle has a zeta-potential, at a pH of 7, between −20 mV and −50 mV. In one embodiment, the lignin nanoparticle has a zeta-potential, at a pH of 7, between −30 mV and −50 mV. In one embodiment, the lignin nanoparticle has a zeta-potential, at a pH of 7, between −35 mV and −45 mV.

In one embodiment, the lignin nanoparticle comprises a polyelectrolyte. Exemplary polyelectrolytes include, but are not limited to, poly(allylamine), poly(dimethyldiallyammonim chloride), polylysine, poly(ethylenimine), poly(allylamine), dextran amine, polyarginine, chitosan, gelatin A, protamine sulfate, poly(styrenesulfonate), polyglutamic or alginic acids, poly(acrylic acid), poly(aspartic acid), poly(glutaric acid), dextran sulfate, carboxymethyl cellulose, hyaluronic acid, sodium alginate, gelatin B, chondroitin sulfate, and heparin. In one embodiment, the polyelectrolyte coats the surface of the nanoparticle. In one embodiment, the polyelectrolyte is adsorbed on the nanoparticle.

In one embodiment, the lignin composition further comprises a protic solvent. Exemplary protic solvents include, but are not limited to, alcohols, water, nitromethane, and acids such as formic acid and acetic acid. In one embodiment, the solvent comprises an alcohol. Exemplary alcohol solvents include, but are not limited to, methanol, ethanol, 1-propanol, 2-propanol, n-butanol, sec-butanol, isobutanol, tert-butanol, 1-pentanol, 2-pentanol, 3-pentanol, 2-methyl-1-butanol, 3-methyl-1-butanol, 3-methyl-2-butanol, 2,2-dimethyl-1-propanol, 1-hexanol, 2-hexanol, 3-hexanol, 2-methylpentan-1-ol, 3-methylpentan-1-ol, 4-methylpentan-1-ol, 2-methylpentan-2-ol, 3-methylpentan-2-ol, 4-methylpentan-2-ol, 2-methylpentan-3-ol, 3-methylpentan-3-ol, 2,2-dimethylbutan-1-ol, 2,3-dimethylbutan-1-ol, 3,3-dimethylbutan-1-ol, 2,3-dimethylbutan-2-ol, 3,3-dimethylbutan-2-ol, 2-ethylbutan-1-ol, 1-octanol, 2-octanol, and 2-ethylhexanol.

In one embodiment, the concentration of lignin in the solvent is between 0.05 mg/ml and 1 mg/ml. In one embodiment, the concentration of lignin in the solvent is between 0.05 mg/ml and 0.9 mg/ml. In one embodiment, the concentration of lignin in the solvent is between 0.05 mg/ml and 0.8 mg/ml. In one embodiment, the concentration of lignin in the solvent is between 0.05 mg/ml and 0.7 mg/ml. In one embodiment, the concentration of lignin in the solvent is between 0.05 mg/ml and 0.6 mg/ml. In one embodiment, the concentration of lignin in the solvent is between 0.05 mg/ml and 0.5 mg/ml. In one embodiment, the concentration of lignin in the solvent is between 0.05 mg/ml and 0.4 mg/ml. In one embodiment, the concentration of lignin in the solvent is between 0.1 mg/ml and 0.4 mg/ml. In one embodiment, the concentration of lignin in the solvent is between 0.1 mg/ml and 0.3 mg/ml. In one embodiment, the concentration of lignin in the solvent is between 0.2 mg/ml and 0.3 mg/ml.

Method of Adsorbing Lignin onto a Petrochemical Oil

In one aspect, the invention relates to a method of adsorbing lignin onto a petrochemical oil. Exemplary process 100 is shown in FIG. 1. In step 110, a solution of lignin in an alcohol is provided. In step 120, oil on a liquid surface is provided. In step 130, the oil is contacted with the solution of lignin in an alcohol. In step 140, the lignin adsorbs to the oil. In step 150, the adsorbed oil is removed from the liquid surface.

In step 110, the lignin may be in any form known to those of skill in the art. Exemplary forms include, but are not limited to, polymeric lignin, microparticles, nanoparticles, granules, powders, and amorphous solids. The alcohol may be any alcohol described herein. The concentration of lignin in the alcohol may be any concentration described herein. In one embodiment, the lignin is in the form of nanoparticles. The average diameter of the nanoparticles may be any diameter described herein.

In step 120, the oil may be any petrochemical oil. Exemplary petrochemical oils include, but are not limited to, fuel oil, crude oil, and distillates/components thereof such as kerosene and gasoline. The liquid surface may comprise any aqueous liquid. Exemplary aqueous liquids include, but are not limited to, freshwater, salt water, distilled water, deionized water, and brackish water. In one embodiment, the oil coats the surface of the aqueous liquid. In one embodiment, the oil coating the surface of the aqueous liquid is from an accidental oil spill. In one embodiment, the oil has just formed on the liquid surface. In one embodiment, the oil the oil is "weathered" oil that has been on the water surface for an hour or longer.

In one embodiment, the thickness of the oil on the liquid surface is less than 10 mm. In one embodiment, the thickness of the oil on the liquid surface is less than 9 mm. In one embodiment, the thickness of the oil on the liquid surface is less than 8 mm. In one embodiment, the thickness of the oil on the liquid surface is less than 7 mm. In one embodiment, the thickness of the oil on the liquid surface is less than 6 mm. In one embodiment, the thickness of the oil on the liquid surface is less than 5 mm. In one embodiment, the thickness of the oil on the liquid surface is less than 4 mm.

In step 130, the oil is contacted with a solution of lignin in an alcohol using any method known in the art. In one embodiment, the solution of lignin in an alcohol is poured onto the oil. In one embodiment, the solution of lignin in an alcohol is sprayed onto the oil. In one embodiment, the lignin in alcohol is sprayed onto the oil using surface vessel spraying. In one embodiment, the lignin in alcohol is sprayed onto the oil using aerial spraying. In one embodiment, the alcohol solubilizes in the water. In one embodiment, the alcohol solubilizes in the oil. In one embodiment, a portion of the alcohol evaporates.

In one embodiment, the step of contacting the oil with a solution of lignin in an alcohol further comprises the step of decreasing the interfacial tension between the liquid surface and the surrounding air.

In some embodiments, the step of contacting the oil with a solution of lignin in an alcohol further comprises step 132, wherein the oil is contacted with one or more additional agents known in the art to adsorb or aid in the cleanup of a petrochemical oil. In one embodiment, the one or more additional agents are selected from the group consisting of bioremediation agents, dispersants, surface collecting agents, and surface washing agents. Exemplary dispersants include, but are not limited to, Accell Clean® DWD, Biodispers, Corexit®, EC9500A, Corexit® EC9500B, Corexit® EC9527A, Dispersit Spc 1000™, FFT-Solution®, Finasol® OSR 52, JD-109, JD-2000™, Mare Clean 200, Marine D-Blue Clean™, Neos AB3000, Nokomis 3-AA, Nokomis 3-F4, Saf-Ron Gold, Sea Brat #4, Seacare Ecosperse 52, Seacare E.P.A., SF-Gold Dispersant, and ZI-400 Oil Spill Dispersant.

Exemplary surface washing agents include, but are not limited to, Accell Clean® SWA, ADP-7, All Purpose Cleaner & Remediator, Aquaclean, Awan PRA Oil Field Solution™, BG-Clean™ 401, Biograss Extra®, Biosolve®, Pinkwater®, Cast Off™, Clean Green, Cleangreen® Planet Wash, CN-110, Corexit®10 EC9580A, Coriba 700 ER, Coriba 700 OS, Coriba 700 SR, Coriba 713 ER, Coriba 713 OS, Coriba 713 SR, Cytosol, De-Solv-It Clean Away APC Super Concentrate, De-Solv-It Industrial Formula, Do-All #18, Dynamic Green™, E-Safe©, Ecovoom-Marine, Enviroclean, Environmental 1 Crude Oil Cleaner, Environmental 1 Washing Agent, EO All Purpose Soap-Lavender, EPA Oil Field Solution™, Ethos Clean, F-500, Fireman's Brand Spillclean, Formula 206-1x, Formula 206-1xBio-Wash™, G-Clean OSC-1809, Global Environmental Cleaner™, Gold Crew SW, Green Beast™ Oil Spill & Odor Remediator, Green Beast Washing Agent, Green Technologies Solutions-Oil Recovery (GTS-OR), Heavy Duty Degreaser Concentrate, Hydro-Clean™, JEP-Marine Clean, Marine Green Clean™, Marine Green Clean Plus™, Nale-It, Naturama G3 A-5, Nature's Way HS, Nokomis 5-W, Nontox™ Surface Washing Agent, Oil Spill Cleanup, OSR-10, Petro-Clean, Petromax PSC 3, Petromax Soil Cleaning And Washing Agent, Petrotech 25, Premier 99, Procleans, Rhamnowash 10, Safe Kleen, Sandklene 950, SC-1000™, Sheen-Magic©, Simple Green®, Simple Green® 2013 Reformulation, SOC 10, Spillclean, Superall #38, Topsall #30, Veru-Solve™ Marine 200 HP, and Water Works™ Heavy Duty Degreaser Concentrate.

Exemplary bioremediation agents include, but are not limited to, ACT Terra Firma, ACT-TF, Agroremed, B&S Industrial, BET Biopetro, Bio-Regen Hydrocarbon, Biorem-2000 Oil Digester™, Biorem-2000 SC, Bioworld BHTP, Drylet™ MB Bioremediation, Dualzorb®, Ergofit Micromix Aqua, Hydroremed, JE1058BS, Land And Sea Restoration Product 001 (Velite), Micro-Blaze®, Microsorb SC, Munox SR®, OilClean w/ Activator, Oil Spill Eater II (OSE II), Oppenheimer Formula, Petroclean™, Pro-Act, Remediade™, S-200C, Shamantra Bio, Shamantra Green, Soil Rx, SP 7010, Spillremed (Industrial), Spillremed (Marine)®, Step One, Sump Safe Bio-Reclaim, System E.T. 20, The Oppenheimer Formula 1, Trailzorb, Tulxa, Txchem HE-1000™, Vaporremed, Vb591™, Vb997™, Binutrix® (B-42), Waste Away®, Whitzorb, and WMI-2000.

Exemplary surface collecting agents include, but are not limited to, Siltech OP-40 and Thickslick 6535.

In step 140, the lignin adsorbs onto the oil. In one embodiment, the adsorption of lignin to the oil forms a layer at the surface of the liquid solution. In one embodiment, the adsorption of lignin to the oil forms a film. In one embodiment, the adsorption of the oil isolates the oil from the liquid surface. In one embodiment, the isolation of the oil from the liquid surface prevents the oil from re-spreading onto the liquid surface. In one embodiment, oil adsorption occurs in less than 24 hours. In one embodiment, oil adsorption occurs in less than 22 hours. In one embodiment, oil adsorption occurs in less than 20 hours. In one embodiment, oil adsorption occurs in less than 18 hours. In one embodiment, oil adsorption occurs in less than 16 hours. In one embodiment, oil adsorption occurs in less than 14 hours. In one embodiment, oil adsorption occurs in less than 12 hours. In one embodiment, oil adsorption occurs in less than 10 hours. In one embodiment, oil adsorption occurs in less than 8 hours. In one embodiment, oil adsorption occurs in less than 6 hours. In one embodiment, oil adsorption occurs in less than 4 hours. In one embodiment, oil adsorption occurs in less than 2 hours.

In step 150, the adsorbed oil is removed from the surface of the liquid using any method known in the art. In one embodiment, the adsorbed oil is removed using mechanical removal. In one embodiment, the adsorbed oil is removed from the surface using a boom. In one embodiment, the adsorbed is removed from the surface using a skimmer. In one embodiment, the adsorbed is removed from the surface by in-situ burning of the oil.

Method of Making a Lignin Nanoparticle Composition

Figure 2:
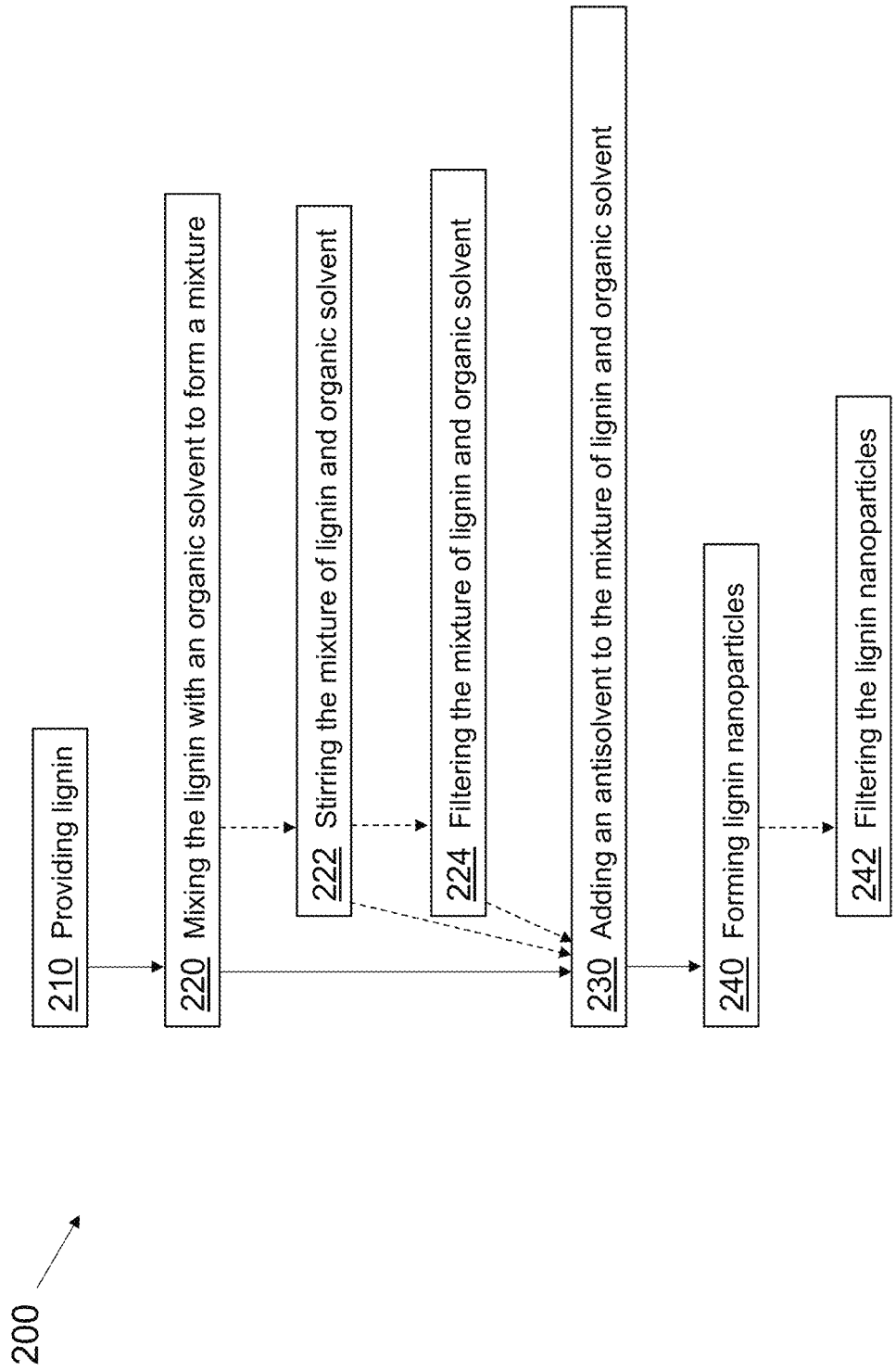
FIG. 2 is a flowchart depicting a method for making a lignin nanoparticle composition.

In another aspect, the invention relates to a method of making a lignin nanoparticle composition. Exemplary process 200 is shown in FIG. 2. In step 210, lignin is provided. In step 220, the lignin is mixed with an organic solvent to form a mixture. In step 230, an antisolvent is added to the mixture of lignin and organic solvent. In step 240, the lignin forms nanoparticles.

In step 210, the lignin may be from any commercially available source. The lignin may be in form known to those of skill in the art. Exemplary forms of lignin are described elsewhere herein.

In step 220, the organic solvent can be any organic solvent known to those of skill in the art. Exemplary organic solvents include but are not limited to, methanol, ethanol, 1-propanol, 2-propanol, n-butanol, 1-pentanol, t-butyl alcohol, carbon tetrachloride, chlorobenzene, ethyl acetate, acetone, dichloromethane, chloroform, benzene, toluene, ethylene glycol, pentane, hexane, diethyl ether, acetic acid, acetonitrile, 1,2-dimethoxyethane, dimethylformamide, dimethyl sulfoxide, 1,4-dioxane, n-methyl-2-pyrrolidinone, nitromethane, pyridine, tetrahydrofuran, triethylamine, xylenes, or a combination thereof. In one embodiment, the lignin is soluble in the organic solvent. In one embodiment, the lignin is partially soluble or insoluble in the organic solvent.

In one embodiment, the concentration of lignin in the organic solvent is between 0.1 and 50 mM. In one embodiment, the concentration of lignin in the organic solvent is between 0.1 and 45 mM. In one embodiment, the concentration of lignin in the organic solvent is between 0.1 and 40 mM. In one embodiment, the concentration of lignin in the organic solvent is between 0.1 and 35 mM. In one embodiment, the concentration of lignin in the organic solvent is between 0.1 and 30 mM. In one embodiment, the concentration of lignin in the organic solvent is between 0.1 and 25 mM. In one embodiment, the concentration of lignin in the organic solvent is between 0.1 and 20 mM. In one embodiment, the concentration of lignin in the organic solvent is between 0.1 and 15 mM. In one embodiment, the concentration of lignin in the organic solvent is between 0.1 and 10 mM. In one embodiment, the concentration of lignin in the organic solvent is between 2 and 8 mM.

In some embodiments, the step of mixing the lignin with an organic solvent comprises step 222, wherein the mixture of lignin and organic solvent is stirred. In one embodiment, the mixture is stirred by hand. In one embodiment, the mixture is stirred using a stir plate. In one embodiment, the mixture is stirred using a vortex mixer. In one embodiment, the mixture is stirred using a sonicator. In one embodiment, the mixture is stirred between 1 minute and 10 hours. In one embodiment, the mixture is stirred between 1 minute and 9 hours. In one embodiment, the mixture is stirred between 1 minute and 8 hours. In one embodiment, the mixture is stirred between 1 minute and 7 hours. In one embodiment, the mixture is stirred between 1 minute and 6 hours. In one embodiment, the mixture is stirred between 1 minute and 5 hours. In one embodiment, the mixture is stirred between 1 minute and 4 hours. In one embodiment, the mixture is stirred between 1 minute and 3 hours. In one embodiment, the mixture is stirred between 1 minute and 2 hours. In one embodiment, the mixture is stirred between 1 minute and 1 hour. In one embodiment, the mixture is stirred between 15 minutes and 1 hour. In one embodiment, the mixture is stirred between 15 minutes and 45 minutes.

In some embodiments, the step of mixing the lignin with an organic solvent comprises step 224, wherein the mixture of lignin and organic solvent is filtered. The mixture can be filtered using any method known in the art. In one embodiment, the mixture is filtered through filter paper. In one embodiment, the mixture is filtered by passing it through a plug of silica or diatomaceous earth. In one embodiment, the mixture is filtered using a syringe filter. In one embodiment, the syringe filter has pores of 0.1 µm to 1 µm. In one embodiment, the syringe filter has pores of 0.1 µm to 0.9 µm. In one embodiment, the syringe filter has pores of 0.1 µm to 0.8 µm. In one embodiment, the syringe filter has pores of 0.1 µm to 0.7 µm. In one embodiment, the syringe filter has pores of 0.1 µm to 0.6 µm. In one embodiment, the syringe filter has pores of 0.2 µm to 0.6 µm. In one embodiment, the syringe filter has pores of 0.3 µm to 0.6 µm. In one embodiment, the syringe filter has pores of 0.35 µm to 0.55 µm.

In step 230, the antisolvent can be any solvent which is miscible in the organic solvent but in which lignin is insoluble or sparingly soluble. Exemplary antisolvents solvents include, but are not limited to, hydrochloric acid, sulfuric acid, nitric acid, hydrogen fluoride, water, distilled water, deionized water, and combinations thereof. In one embodiment, the antisolvent is added to the mixture of lignin and organic solvent all at once. In one embodiment, the antisolvent is added to the mixture of lignin and organic solvent dropwise. In one embodiment, the mixture of lignin and organic solvent is stirred as the antisolvent is added. Exemplary stirring methods are described elsewhere herein.

In one embodiment, the antisolvent is added such that the volume ratio of antisolvent to organic solvent is between 1:1 and 100:1. In one embodiment, the antisolvent is added such that the volume ratio of antisolvent to organic solvent is between 1:1 and 90:1. In one embodiment, the antisolvent is added such that the volume ratio of antisolvent to organic solvent is between 1:1 and 80:1. In one embodiment, the antisolvent is added such that the volume ratio of antisolvent to organic solvent is between 1:1 and 70:1. In one embodiment, the antisolvent is added such that the volume ratio of antisolvent to organic solvent is between 1:1 and 60:1. In one embodiment, the antisolvent is added such that the volume ratio of antisolvent to organic solvent is between 1:1 and 50:1. In one embodiment, the antisolvent is added such that the volume ratio of antisolvent to organic solvent is between 1:1 and 40:1. In one embodiment, the antisolvent is added such that the volume ratio of antisolvent to organic solvent is between 1:1 and 30:1. In one embodiment, the antisolvent is added such that the volume ratio of antisolvent to organic solvent is between 1:1 and 20:1. In one embodiment, the antisolvent is added such that the volume ratio of antisolvent to organic solvent is between 1:1 and 15:1.

In one embodiment, the antisolvent is added such that the volume ratio of antisolvent to organic solvent is between 1:1 and 1:50. In one embodiment, the antisolvent is added such that the volume ratio of antisolvent to organic solvent is between 1:1 and 1:45. In one embodiment, the antisolvent is added such that the volume ratio of antisolvent to organic solvent is between 1:1 and 1:40. In one embodiment, the antisolvent is added such that the volume ratio of antisolvent to organic solvent is between 1:1 and 1:35. In one embodiment, the antisolvent is added such that the volume ratio of antisolvent to organic solvent is between 1:1 and 1:30. In one embodiment, the antisolvent is added such that the volume ratio of antisolvent to organic solvent is between 1:1 and 1:25. In one embodiment, the antisolvent is added such that the volume ratio of antisolvent to organic solvent is between 1:1 and 1:20. In one embodiment, the antisolvent is added such that the volume ratio of antisolvent to organic solvent is between 1:1 and 1:15. In one embodiment, the antisolvent is added such that the volume ratio of antisolvent to organic solvent is between 1:1 and 1:10.

In one embodiment, the antisolvent has a molarity of between 0.01 M and 0.5 M. In one embodiment, the antisolvent has a molarity of between 0.01 M and 0.45 M. In one embodiment, the antisolvent has a molarity of between 0.01 M and 0.4 M. In one embodiment, the antisolvent has a molarity of between 0.01 M and 0.35 M. In one embodiment, the antisolvent has a molarity of between 0.01 M and 0.3 M. In one embodiment, the antisolvent has a molarity of between 0.01 M and 0.25 M. In one embodiment, the antisolvent has a molarity of between 0.01 M and 0.20 M. In one embodiment, the antisolvent has a molarity of between 0.01 M and 0.15 M. In one embodiment, the antisolvent has a molarity of between 0.01 M and 0.1 M. In one embodiment, the antisolvent has a molarity of between 0.01 M and 0.05 M.

In step 240, the lignin forms nanoparticles. In one embodiment, the addition of one or more antisolvents causes the lignin to phase separate and form nanoparticles. The nanoparticles can have any average diameter described elsewhere herein.

In some embodiments, the step of forming nanoparticles further comprises step 242, wherein the nanoparticles are filtered to separate them from the organic solvent and antisolvent. Any filtration method known in the art can be used. Exemplary filtration methods are described elsewhere herein.

EXPERIMENTAL EXAMPLES

The invention is now described with reference to the following Examples. These Examples are provided for the purpose of illustration only, and the invention is not limited to these Examples, but rather encompasses all variations that are evident as a result of the teachings provided herein Example 1: Binding of Lignin Nanoparticles at the Oil-Water Interface: An Ecofriendly Alternative to Oil Spill Recovery Materials Kraft lignin, Indulin AT lignin powder (lot no. MB05), was obtained from MeadWestvaco (MWV) Corp., U.S.A. Organosolv lignin, HPL powder with number-average molecular weight of 969 Da, was obtained from Lignol Innovations Ltd., Canada. Ethylene glycol (purity >99%), hydrochloric acid, and nitric acid were obtained from Sigma-Aldrich, U.S.A. Acetone (purity >99.5%), sodium hydroxide, Whatman Anotop 25-0.02 µm and 0.45 µm nylon syringe filters were obtained from Fisher Scientific, U.S.A. Dialyzed water was prepared with a Elga Purelab® water purification system with UV module.

Synthesis

Synthesis of Indulin AT Lignin Nanoparticles

In a typical batch synthesis of the nanoparticles, 0.25 g of Indulin AT biopolymer was dissolved in 50 mL of ethylene glycol. The solution was vortexed for 30 min, filtered with a 0.45 µm syringe filter, and placed into a scintillation vial. The particles were synthesized by rapidly adding 1.0-3.0 mL of 0.025 M $HNO_3$ to 5 mL of ethylene glycol containing dissolved lignin, while vigorously stirring the sample.

Synthesis of High Purity Lignin (HPL) Nanoparticles

Method 1:

High Purity Lignin (Lignol Innovations Ltd.) isolated from the Organosolv process is used as a precursor for the synthesis of lignin NPs. The NPs were synthesized from the precursor by first dissolving the lignin polymer into its good solvent, and then rapidly adding an antisolvent inducing nucleation and growth of the NPs (Richter, A. P. et al., Langmuir, 2016, 32:6468-6477). Briefly, 0.5 g of lignin powder was dissolved in 130 ml of acetone (good solvent). 1 ml of this lignin polymer solution was transferred into 9.2 ml of water (antisolvent) with vigorous stirring. The acetone in the mixtures was allowed to evaporate under constant stirring at 25° C. for 24 hours.

Method 2:

In a typical Organosolv lignin nanoparticle batch synthesis, 0.25 g of HPL was dissolved in 50 mL of acetone. The stock solution was vortexed for 30 min and filtered with a 0.45 µm syringe filter. Then, 1 mL of the solution was placed into a 20 mL scintillation vial. Addition of 9.2 mL of water induced supersaturation of lignin in the solution and resulted into phase separation of lignin in the form of nanoparticles. In a typical experiment, 1 mL of 0.5 wt % HPL lignin in acetone was transferred into a glass vial. In the second step, 9.2 mL of the antisolvent, water, was added to the vial. A syringe pump was used to control the rate of antisolvent addition in the range of 1-220 mL/min. Further increase in antisolvent addition rate (up to 1100 mL/min) was achieved by direct pipetting. The samples obtained were then further diluted with water to 0.05 wt %.

Characterization of Lignin NPs

Transmission Electron Microscopy and Dynamic Light Scattering Measurements

Figure 3A:
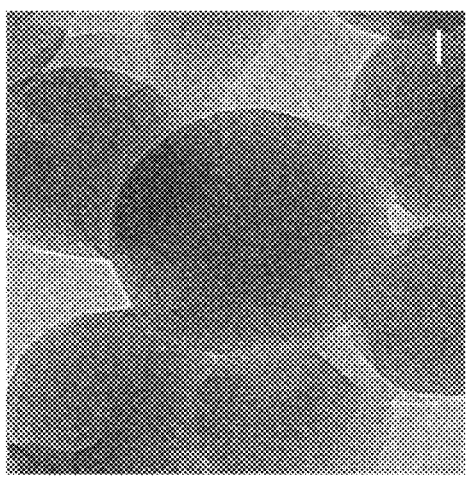
FIG. 3A, FIG. 3B, and FIG. 3C, depicts the characterization of lignin nanoparticles (NPs).
Figure 3B:
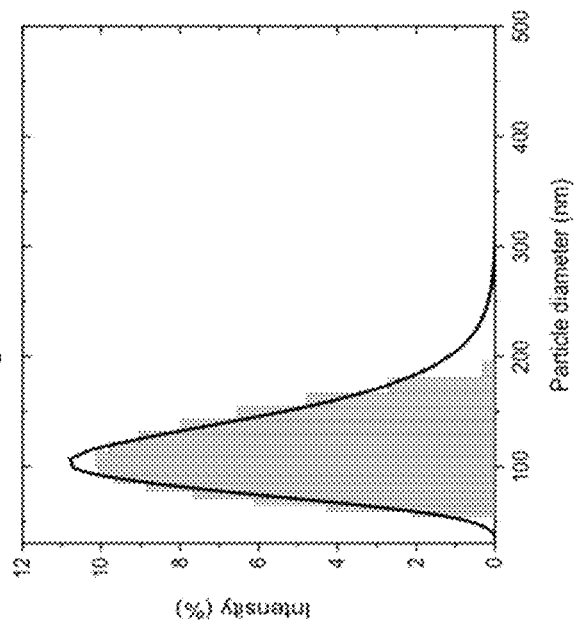
Figure 3C:
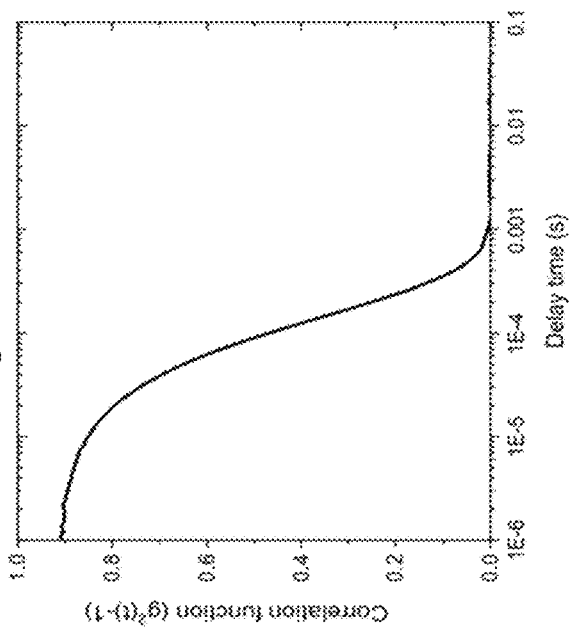
Figure 4:
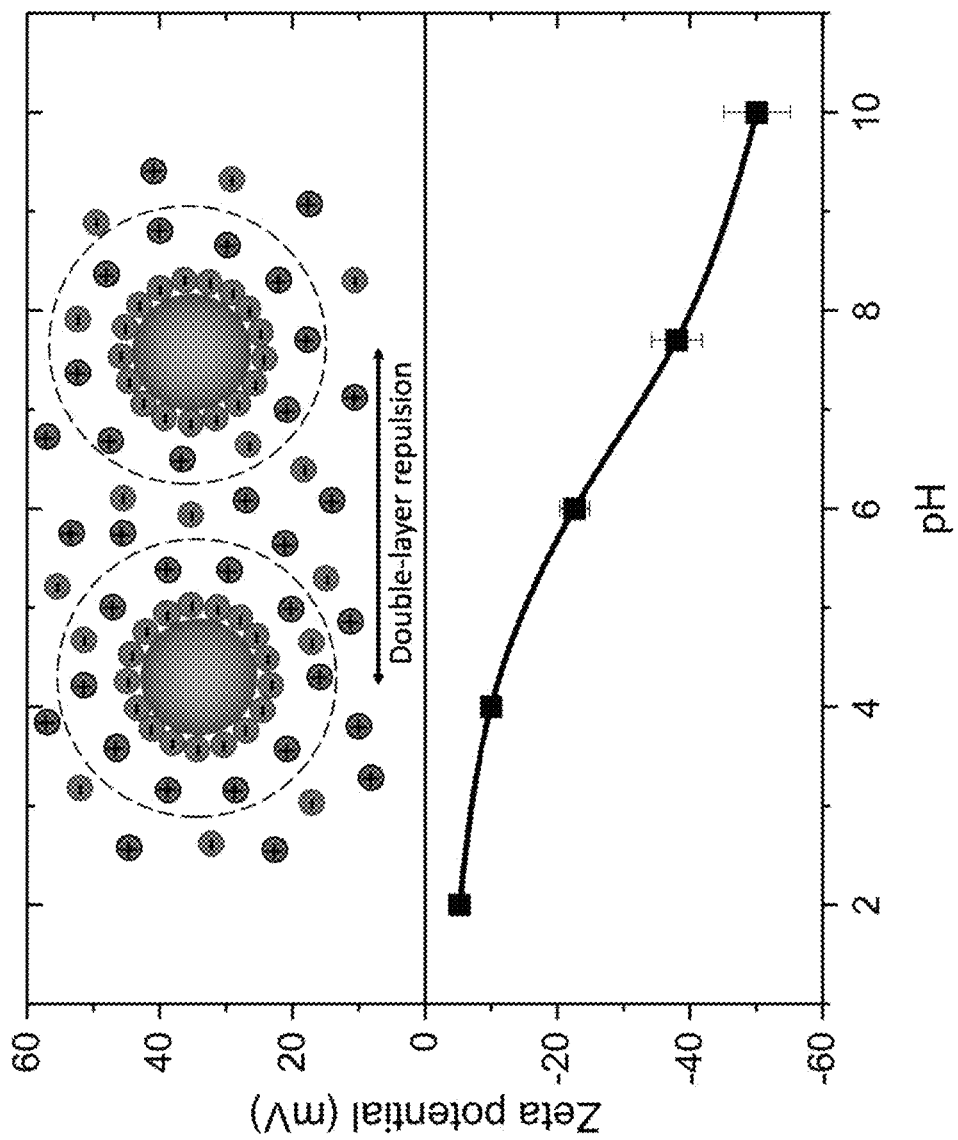
FIG. 4 depicts the zeta ($\zeta$)-potential of lignin NPs as a function of pH. The isoelectric point is shown at ~pH 2, and particle dispersion remains stable at wide range of pH (pH 4-10) due to electrostatic repulsion. The inset schematic shows the principle of double layer repulsions, where the overlap of the diffused counter ion layer induces a repulsive osmotic pressure that stabilizes the particles.

The synthesized lignin NPs were characterized for their size and polydispersity using Transmission Electron Microscopy (TEM) and Dynamic Light Scattering (DLS) (FIGS. 3A-C). The TEM image analysis and DLS provides an average diameter of spherical lignin NPs ~100 nm, with polydispersity index of ~0.15. At pH 7, the zeta potential of the lignin particles was −40 mV with isoelectric point ~pH 2 (FIG. 4). Therefore, lignin NP stability in aqueous dispersion in the pH range 4-10 is attributed to interparticle electrostatic double layer repulsions (Richter, A. P. et al, Langmuir, 2016, 32:6468-6477).

Interfacial Tension (IFT) Measurements

In IFT measurements, decane was used as a model oil and the change in decane-water IFT upon increasing lignin NP concentration is determined. Optical tensiometry (Biolin Scientific) was used to determine the decane-water IFT. A 1 cm×1 cm×10 cm quartz cuvette filled with decane was placed in the optical path and a 20 µl pendent drop of aqueous lignin NP dispersion was generated in the decane phase. The interfacial tension (γ) was measured from $$\gamma = \Delta \rho g \frac{R_0^2}{\beta},$$

where $\Delta\rho$ is density difference between fluid, g is gravitational constant, $R_0$ is radius of drop curvature at apex, and $\beta$ is a shape factor, calculated from the Young-Laplace equation (Mobius, D. et al., Drops and Bubbles in Interfacial Research, Elsevier Science, 1$^{st}$ Ed., 1998).

$$\frac{d\phi}{ds} = 2 + \beta z - \frac{\sin\phi}{x}$$

$$\frac{dx}{ds} = \cos\phi \text{ and } \frac{dz}{ds} = \sin\phi$$

The change in IFT was determined by analyzing the drop-shape (FIGS. 5A-B) (MacLoad, C. A., Journal of Colloid and Interface Science, 1993, 435448).

Spreading Coefficient Calculations

Spreading coefficient is defined as $$S = \gamma_{A/W} - (\gamma_{O/W} + \gamma_{A/O})$$

wherein $\gamma_{A/W}$ is air-water surface tension, $\gamma_{O/W}$ is oil-water interfacial tension, and $\gamma_{O/A}$ is air-oil surface tension.

A. Before Adding the Herder $\gamma_{A/W}$=72 mN/m
$\gamma_{O/W}$=32 mN/m
$\gamma_{O/A}$=22 mN/m
S=+18 mN/m B. Immediately after Spraying Mixture of Lignin NPs and Pentanol $\gamma_{A/W \text{ or } A/pentanol}$=26 mN/m
$\gamma_{O/W}$=32 mN/m
$\gamma_{O/A}$=22 mN/m
S=−28 mN/m $\gamma_{A/W \text{ or } A/pentanol}$ is reduced significantly because of the lower surface tension of 1-pentanol which spreads over the air water interface, resulting in the negative spreading coefficient.

C. After Solubilization of Pentanol $\gamma_{A/W}$=56 mN/m (reduced due to adsorption of lignin nanoparticles to the air-water interface)
$\gamma_{O/W}$=13 mN/m (reduced due to adsorption of lignin NPs on oil-water interface)
$\gamma_{O/A}$=22 mN/m
S=+21 mN/m Despite the positive spreading coefficient, the herded crude oil remains as a thick slick due to adsorbed lignin NPs at the oil-water interface which prevents re-spreading into a thin film.

Adsorption of Lignin NPs onto the Oil-Water Interface

Figure 6B:
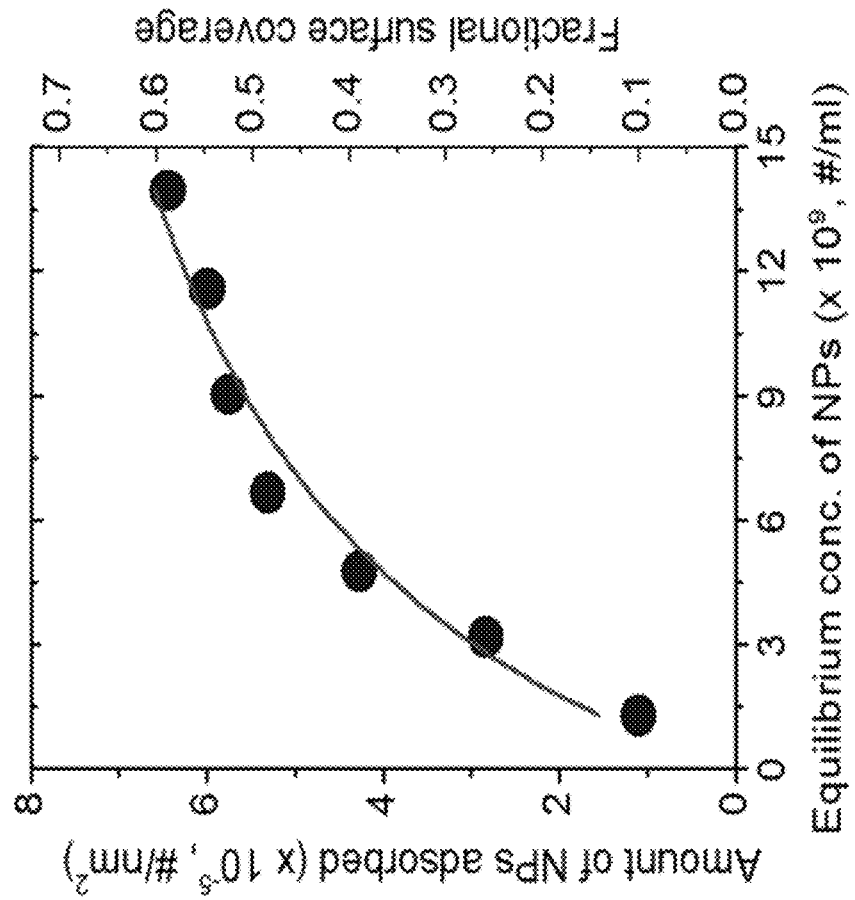
FIG. 6A and FIG. 6B, depicts an adsorption isotherm of NPs onto a decane-water interface and a schematic of how the isotherm was obtained.
Figure 6A:
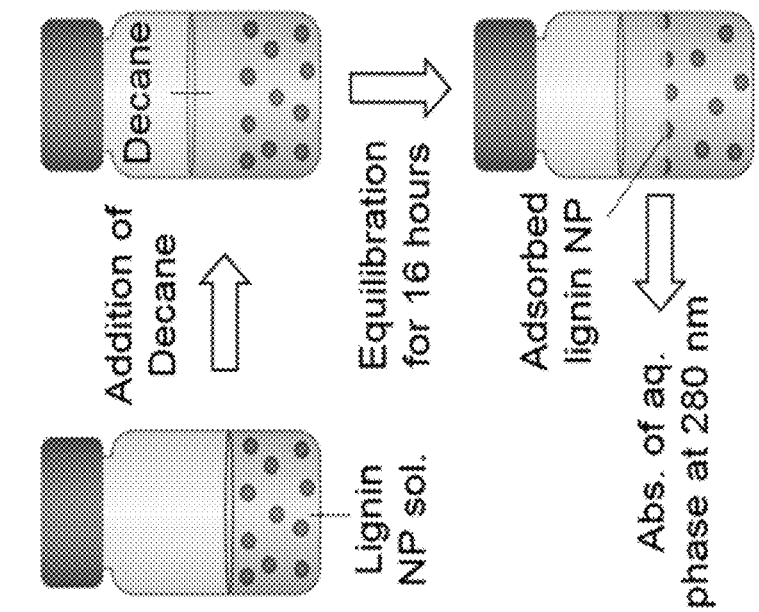

The lignin NPs have an affinity for the oil-water interface which drives the adsorption of the NPs at the oil-water interface. This behavior was quantified by experimentally measuring the adsorption isotherm of lignin NPs onto the oil-water interface. The adsorption isotherm was measured by the solvent depletion method (Bharti, B. et al., Soft Matter, 2012, 8:6573-6581; Bharti, B. et al., Soft Matter, 2014, 10:718-728; Meissner, J. et al., Colloid Polym. Sci., 2015, 293:3381-3391), where a change in the concentration of lignin NPs in the aqueous phase upon equilibration with a model oil (here decane) is monitored. Briefly, 0.8 ml of lignin NP solution of known concentration (co) is equilibrated for 16 hours with a 0.2 ml of decane in a scintillation vial (FIG. 6A). The equilibrium concentration (c) of lignin NPs in the aqueous phase is determined by monitoring the decrease in absorbance at a wavelength of 280 nm. The amount of lignin adsorbed ($\Gamma$) onto the decane-water interface is given by $$c = a\frac{\Gamma}{(\Gamma_m - \Gamma)}\exp\left(\frac{K\Gamma}{\Gamma_m}\right) \quad (1)$$

where V is the volume of the aqueous phase, and A is the area of the oil-water interface. Further experimental details on the measurement of adsorption isotherm can be found elsewhere (Bharti, B. et al., Langmuir, 2011, 27:9823-9833; Hua, X. et al., Langmuir, 2018, 34: acs.langmuir.8b00053; Hua, X. et al., Langmuir, 2016, 32:11341-11352; Hua, X. et al., Soft Matter, 2018, 14:3818-3828). The experimentally determined surface excess of the lignin NPs at the decane-water interface is shown in FIG. 6B. Here, the amount of lignin NP adsorbed is analyzed using the Frumkin adsorption isotherm model. The model is based on the adsorption of species onto a two dimensional lattice under Bragg-Williams approximations, and it is the simplest model that allows for non-ideal interaction amongst species adsorbed at liquid-liquid interfaces (Kolev, V. L., et al., Langmuir, 2002, 18:9106-9109; Hua, X. et al., Soft Matter, 2018, 14:3818-3828). According to the Frumkin model, the amount of nanoparticles adsorbed at the oil-water interface is related to the equilibrium concentration of nanoparticles in bulk as (Hua, X. et al., Langmuir, 2016, 32:11341-11352)

$$\Gamma = \frac{(c_0 - c)V}{A},$$

Where $\Gamma_m$ is the maximum surface excess, a is the dissociation constant characteristic of the binding of lignin NP to the interface, and K is the pair interaction energy (in $k_BT$, $k_B$ is Boltzmann constant and T is temperature) between adsorbed lignin NPs at the interface. The model fit to the experimental data using equation 1 (FIG. 6B) gives $a=7\times10^9$ #/ml, $K=-1.1$ $k_BT$, and $\Gamma_m=9.9\times10^{-5}$ #/nm², here # represents the number of lignin NPs. The positive value of parameter a highlights a net repulsion between the negatively charged interface and the lignin nanoparticles (Wang, H. et al, J. Phys. Chem. Lett., 2012, 3:2986-2990; Zhang, Y. et al., Langmuir, 2017, 33:4511-4519). This weak repulsion between the lignin NP and the interface can be overcome by the hydrophobic interactions known to be operational between similar biopolymer based nanoparticles and an oil-water interface (Bizmark, N. et al., Langmuir, 2014, 30:710-717). In addition, the small negative value of K on the order of thermal energy highlights a weak repulsion between the particles adsorbed. The values of the dissociation constant a, and interaction energy K obtained here are in agreement with the previously reported adsorption of gold nanoparticles on an oil-water interface, where a similar net weak repulsion ($\sim k_BT$) between the particles was reported (Hua, X. et al., Langmuir, 2018, 34: acs.langmuir.8b00053; Hua, X. et al., Soft Matter, 2018, 14:3818-3828). It should be noted that, due to this repulsion, the nanoparticles form a sub-monolayer occupying 60-70% of the interfacial area, and a compression of the interface is necessary to achieve a film formation.

Measurement of Lignin NP—Pentanol Oil-Herding 10 ml of aqueous solution of 0.4 M NaCl (typical seawater salinity) was placed in a glass Petri dish and 0.5 ml of crude oil was spread on the surface of the water. A single drop (~0.1 ml) of 9:1 lignin NP-pentanol test solution having a lignin NP concentration of 0.25 mg/ml was then added to the Petri dish. The change in surface area occupied by the crude oil (Louisiana sweet crude oil) was monitored using a digital camera and quantified using image analysis.

Calculation of Bending Energy (U) of Lignin NP Film Formed in Decane

Figure 7C:
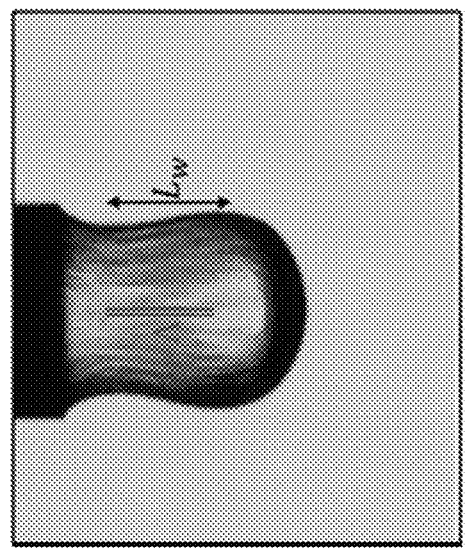
FIG. 7A, FIG. 7B, and FIG. 7C, depicts the deflation of volume of a lignin NP drop in decane.
Figure 7B:
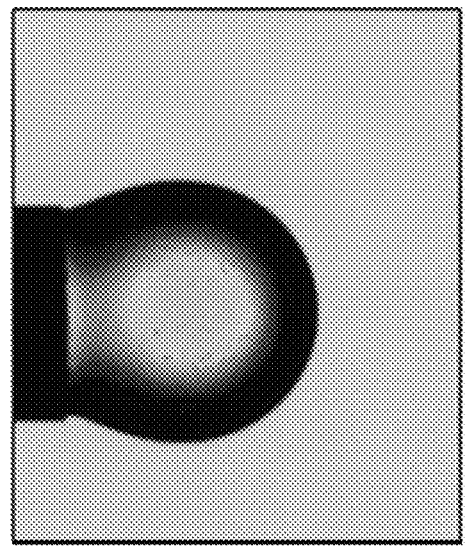
Figure 7A:
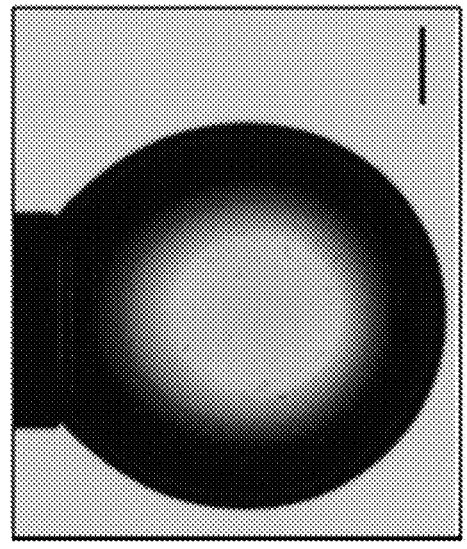

The bending energy was estimated by shape and wrinkle analysis of drop, introduced by Knoche et al. (Knoche, S. et al., Langmuir, 2013, 29:12463-12471; Vaccari, L. et al., Soft Matter, 2015, 11:6062-6074; Cousins, W. J., Wood Sci. Technol., 1976, 10:9-17). The bending energy ($E_B$) is $$E_B = \frac{\tau_s \Lambda^4}{16\pi^2 L_w^2},$$

where $\tau_s$ is meridional tension, $\Lambda$ is a wrinkle wavelength, and $L_w$ is a length of wrinkles. $\Lambda$ and $L_w$ were measured by image from FIG. 7C with ImageJ software tool in the estimated values of $\Lambda \sim 0.14\times10^{-5}$ m, $L_w \sim 7.6\times10^{-4}$ m, and $$\tau_s \sim 18.3 \frac{mN}{m}.$$

The results of the experiments will now be discussed

Figure 8:
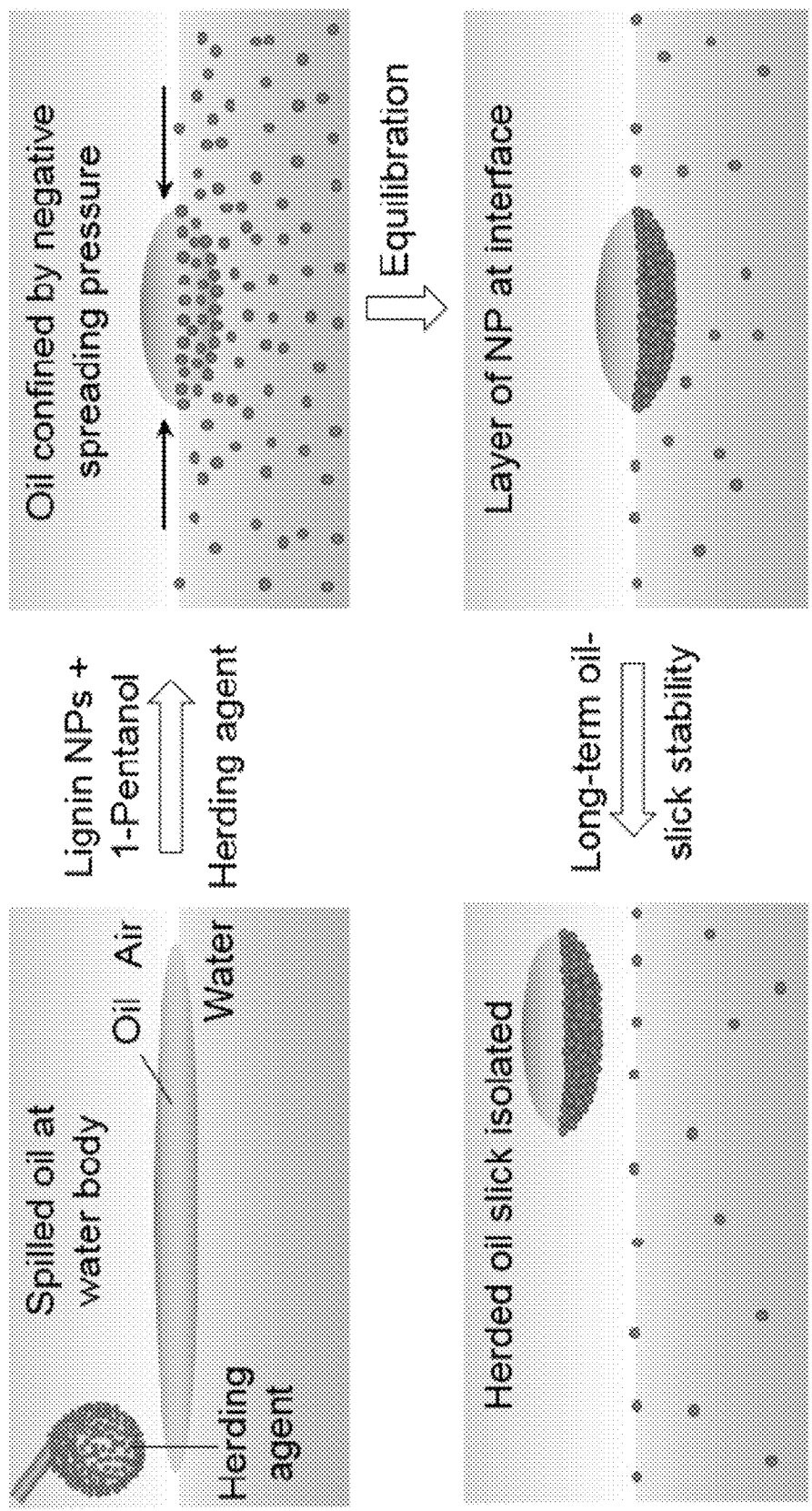
FIG. 8 depicts a schematic representation of the oil-herding process achieved by a lignin NP based solution. The oil is first confined to a thick slick by initial Marangoni flow generated by 1-pentanol. While the alcohol solubilizes, lignin NPs irreversibly adsorb at the oil-water interface and form a film. The film restricts re-spreading of oil on water surface, and enables its safe and easy removal using physical methods.

The present invention relates in part to a new class of eco-friendly oil-herders using biocompatible lignin NPs. The lignin NPs are found to have affinity for oil-water interface, which drives the formation of an interfacial film. The application of a mixture of 1-pentanol (or another heavy alcohol) and lignin NP solution for oil-herding is illustrated in FIG. 8. The role of the heavy alcohol is to generate an initial Marangoni flow at the oil-water interface, which enables herding or collection of oil. The alcohol solubilizes in crude oil and water after initial few minutes (Goral, M. et al., J. Phys. Chem. Ref. Data, 2007, 36:133-190; Skrzecz, A. et al., J. Phys. Chem. Ref Data, 1999, 28:983-1235), and during this time interval, lignin NPs adsorb onto the herded oil-water interface, restricting re-spreading of confined or "herded" oil on water surface and allowing its removal using mechanical methods (FIG. 8).

Lignin is the most abundant aromatic biopolymer in nature (Rahikainen, R. et al., Bioresour. Technol., 2013, 133:270-278; Richter, A. P. et al., Langmuir, 2016, 32:6468-6477). It is inexpensive and widely available as a by-product of paper industry (Richter, A. P. et al., Langmuir, 2016, 32:6468-6477; Tripathi, A. et al., ACS Sustain. Chem. Eng., 2017, 5: 2483-2492). Lignin is of natural origin and lacks in cytotoxicity towards living cells (Ugartondo, V. et al., Bioresour. Technol., 2008, 99:6683-6687; Richter, A. P. et al, Nat. Nanotechnol., 2015, 10:817-823). This biocompatibility of lignin makes it an appropriate precursor for synthesizing functional nanomaterials with minimal environmental footprint. The lignin macromolecule contains several chemical functional groups such as phenols, ethers and phenylpropanoid, which makes it a weak amphiphile (Campbell, M. M. et al., Plant Pysiol., 1996, 110:3-13; Sathitsuksanoh, N. et al., Green Chem., 2014, 16:1236-1247). The amphiphilicity of lignin molecule initiates its binding to oil-water interface and facilitates the formation of Pickering emulsions and foams (Wei, Z. et al., Green Chem., 2012, 14:3230-3236; Lam, S. et al., Curr. Opin. Colloid Interface Sci., 2014, 19:490-500). The interfacial binding energy of molecules is significantly smaller than NPs, and the molecules can desorb from the oil-water interface upon decreasing their concentration in bulk solution (Du, K. et al., Langmuir, 2010, 26:12518-12522). Because of the higher binding energy, the NPs adsorb at oil-water interfaces almost irreversibly (Bizmark, N. et al., Langmuir, 2014, 30:710-717). NPs formed by lignin can be adsorbed at oil-water interfaces irreversibly and significantly decrease interfacial tension. This ability of lignin NPs enables the development of a new class of ecofriendly oil-herding agent that not only allows for collection of spilled-oil, but also its safe removal (FIG. 8).

The lignin NPs are surface active and have an affinity for oil-water interface. This activity drives a dynamic change in the interfacial free energy upon direct contact between the aqueous lignin NP solution and oil phase (Bizmark, N. et al., Langmuir, 2014, 30:710-717). The change in energy of oil-water interface was quantified by measuring interfacial tension (IFT) between oil and aqueous lignin NP phase. For this measurement, decane is used as a model oil and the change in decane-water IFT upon increasing lignin NP concentration is determined.

Figure 9:
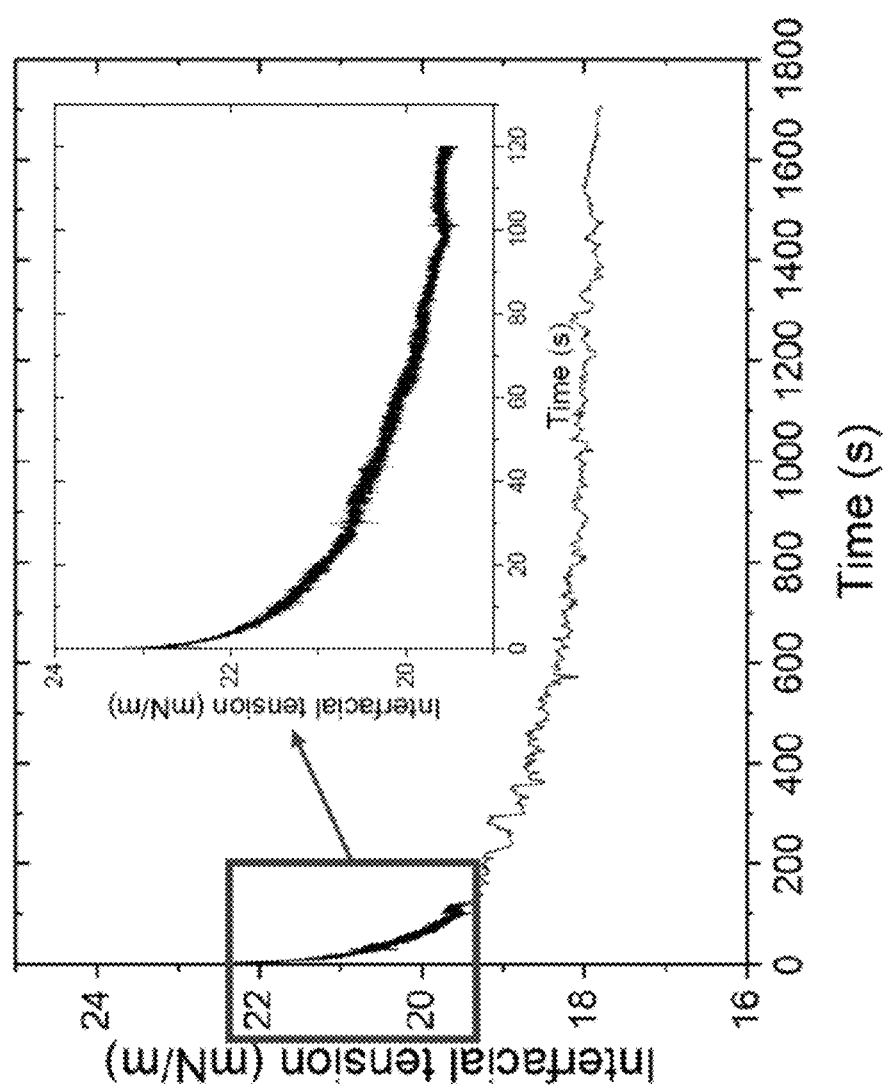
FIG. 9 depicts the decrease in oil-water interfacial tension seen when lignin nanoparticles aggregate and the interface. The inset shows the rapid initial change in interfacial tension.
Figure 11:
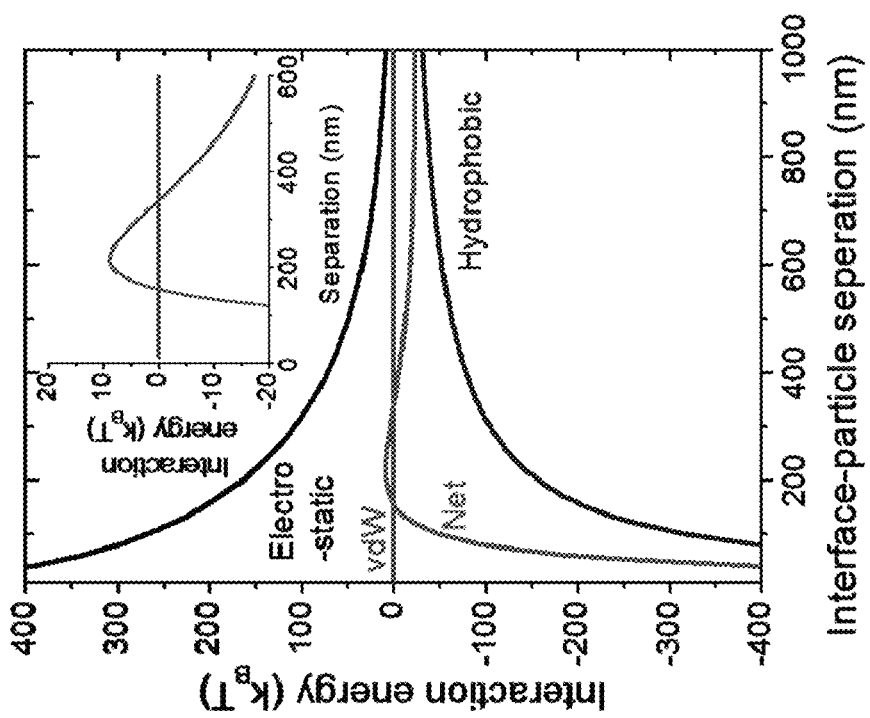
FIG. 11 depicts the pair interaction energy between a lignin NP and a flat oil-water interface as a function of interface-particle distance. The net interaction energy is the sum of electrostatic, van der Waals, and hydrophobic interactions between the lignin NPs and decane-water interface.
Figure 12:
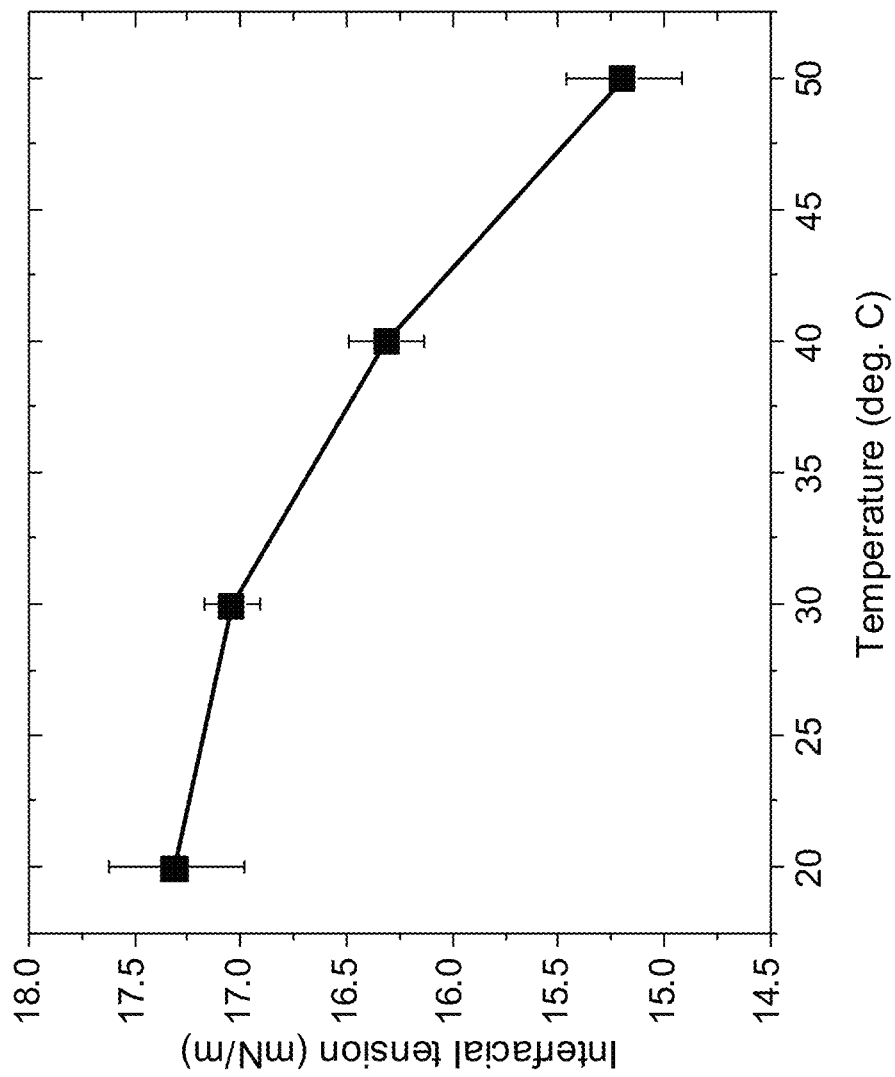
FIG. 12 depicts the interfacial tension between crude oil and a 0.1 mg/ml lignin NPs dispersion containing 0.4 M NaCl solution. The interfacial tension decreases with increasing temperature. This is attributed to faster diffusion of NPs toward the oil-water interface and a decrease in the interfacial tension of the pristine oil-water interface at higher temperatures.

The adsorption of lignin NPs at decane-water interface is driven by electrostatic, and hydrophobic interactions between the bulk particles and the interface (Bizmark, N. et al., Langmuir, 2014, 30:710-717; Wang, H. et al., J. Phys. Chem. Lett., 2012, 3:2986-2990; Zhang, Y. et al., Langmuir, 2017, 33:4511-4519). In addition, a "time-dependent" NP concentration gradient between the particle and interface also plays a critical role in the interfacial binding of the particles (Dugyala, V. R. et al., Phys. Chem. Chem. Phys., 2016, 18:5499-5508). The amount of NPs adsorbed at the interface and corresponding IFT is dependent on oil-aqueous phase contact time (t). It was found that for 0.01 mg/ml lignin NPs, the IFT rapidly decreases from 52 mN/m to 47 mN/m at initial contact times t<5 min (FIG. 9). The IFT attains a constant value of 45.5 mN/m at t>20 min (FIG. 10A). The initial rapid decrease in IFT is attributed to the adsorption of the nanoparticle at the pristine decane-water interface. The total adsorption energy is given by the sum of hydrophobic, and DLVO-type (van der Waals and electrostatic) interactions between unabsorbed lignin NPs in bulk and negatively charged oil-water interface (FIG. 11) (Bizmark, N. et al., Langmuir, 2014, 30:710-717; Hua, X. et al., Soft Matter, 2018, 14:3818-3828). It was found that the equilibrium IFT decreases upon increasing thermal energy (temperature) of the particles (FIG. 12). This is attributed to the higher diffusion rate and energy of the particles, which enables overcoming the electrostatic repulsive barrier existing between the interface and unabsorbed particles.

The lignin NP adsorption energy ($\Delta E$) onto the decane-water interface is calculated as (Bizmark, N. et al, Langmuir, 2014, 30:710-717) $\Delta E = \pi R^2 \gamma_0 (1-|\cos \theta|)$, where $\gamma_0 = 52.2$ mN/m is the IFT of pristine decane-water interface, R (~50 nm) is the radius of NP, and $\theta$ is the interfacial contact angle of lignin NPs. The contact angle measurements for a NP at the oil-water interface are nontrivial. In this study, it was assumed that the wetting properties of lignin NPs are similar to well-investigated ethyl cellulose NPs, and $\theta = 750$ was used for the binding energy calculations (Bizmark, N. et al., Langmuir, 2014, 30:710-717). In practice, the value $\theta$ can be higher, and the above equation will only provide a rough estimate of $\Delta E$. The adsorption energy estimated for lignin NPs at decane-water interface is $\sim 7.5 \times 10^3$ $k_B T$; where $k_B$ is the Boltzmann constant and T is the temperature. The large binding energy of lignin NP highlights the strong affinity and irreversible binding of the particles to the oil-water interface.

The rate of IFT decrease slows down at longer equilibration time. This decrease is attributed to additional energy required to compensate for the stearic, and electrostatic repulsions between the NPs adsorbed at the interface and unabsorbed NPs in the bulk aqueous phase (Wang, H. et al., J. Phys. Chem. Lett., 2012, 3:2986-2990; Zhang, Y. et al., Langmuir, 2017, 33:4511-4519). The repulsion and necessary rearrangement of the NPs at the interface result into the observed decrease in the rate of IFT change (Bizmark, N. et al., Langmuir, 2014, 30:710-717). The equilibrium value of the IFT is governed by the above-mentioned interactions, which is dependent on the bulk concentration of lignin NPs. It was found that the IFT decreases from 47.5 to 22 mN/m upon increasing lignin NP concentration from 0.01 to 0.25 mg/ml (FIGS. 10A-B). A similar behavior is found for IFT changes for a crude oil and aqueous lignin nanoparticle interface (FIGS. 13A-B). Increasing bulk lignin NP concentration leads to higher interfacial excess of NPs due to a higher concentration gradient of NPs between the bulk and interface, which is in agreement with previous reports (Hua, X. et al, Soft Matter, 2018, 14:3818-3828; Hua, X. et al., Langmuir, 2018, 34:4830-4842).

The transport of particles to the interface was characterized using fluorescence microscopy wherein lignin NPs were selectively labelled with Nile red dye. The mechanism of film formation/particle layer formation was determined by tracking the change in the fluorescent intensity distribution within a droplet of lignin NP dispersion submerged in decane (FIGS. 14A-B). To obtain these measurements, a 1.0 µl droplet of 0.2 mg/ml of lignin NP solution was placed in a glass Petri dish, and 5 ml of decane was added to completely submerge the droplet. Initially, the nanoparticles were uniformly distributed within the droplet. After 40 minutes, the integrated fluorescence intensity of bulk particles reduced to half the initial value (FIG. 14B), but the intensity at the droplet edge increases. The intensity at the center of the droplet was further reduced to 20% after 120 minutes (FIG. 10B). This decrease in fluorescent intensity was due to the transport of lignin NPs away from droplet center towards the droplet edge (FIG. 14B). The increase in number density of the nanoparticles at the oil-water interface was confirmed by Scanning Electron Microscopy (SEM) and Transmission Electron Microscopy (TEM) as shown in FIGS. 14C-D.

Figure 14E:
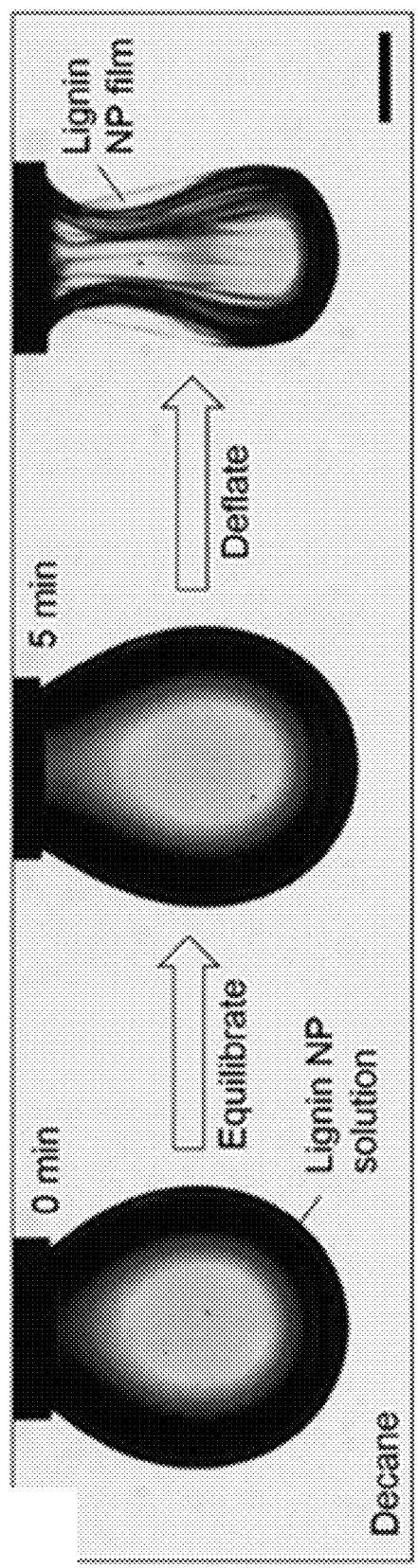
FIG. 14E depicts a pendant drop of aqueous lignin NP solution submerged in decane and characterization of the pendant drop.

In a pendant drop of aqueous lignin NPs solution submerged in decane, the particles are continuously transported to the decane-water interface. The presence of a lignin NP layer/film was confirmed by compressing the pendant drop after 5 min of contact time with water (FIG. 14E), and additionally by TEM and SEM (FIGS. 14C-D). The origin of this film formation is the interfacial jamming of the lignin NPs. Here the particles adsorbed at the interface forming a sub-monolayer are compressed together due to deflation of the pendant droplet. Similar interfacial phenomenon have been reported previously, where the particles at liquid-liquid interface were jammed upon relaxation of a stretched droplet (Cui, M. et al., Science, 2013, 342:460-463). The bending energy (U) of lignin NP film formed is calculated by the number of wrinkles on the film formed by the pendant droplet. It was found that U is dependent on the bulk decane-water contact time, and typically in the range of $7.7 \times 10^{-15}$ N-m (FIG. 6A-C). This bending energy value is intermediate between the interfacial films formed by inorganic oxides and natural bacteria (Niepa, T. H. R. et al., Sci. Rep., 2017, 7:17864; Knoche, S. et al., Langmuir, 2013, 29:12463-12471). In this case, the film formation is the key in achieving a long term-stability of the oil-slick after initial herding and its safe removal from the water surface.

Figure 15:
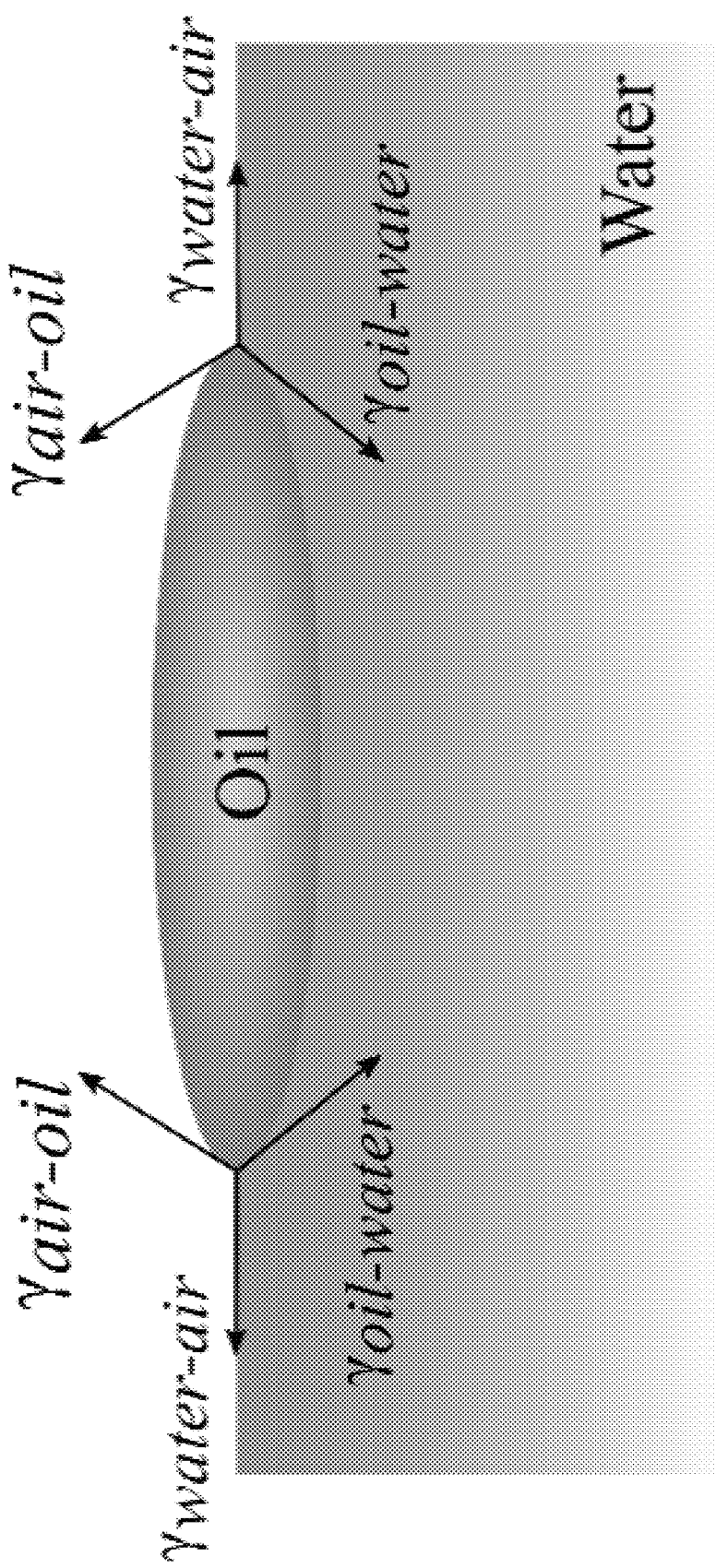
FIG. 15 depicts the oil-herding process and the spreading coefficient wherein γ is the surface/interfacial tensions, between air, water, and oil. The arrows represent the direction of operational surface tension force.

Oil spreads on the water surface in the form of a thin lens due to the imbalance of forces at the three-phase contact line (FIG. 15). The spreading and confining of oil lens on water is governed by spreading coefficient, S, derived from force balance at interface and given as (Gupta, D. et al., Sci. Adv., 2015, 1:e1400265-e1400265; Kunieda, M. et al., Energy and Fuels, 2012, 26:2736-2741; Tadmor, R. et al., Langmuir, 2008, 24:3185-3190) $S=\gamma_{aw}-(\gamma_{ow}+\gamma_{oa})$, where $\gamma_{aw}$, $\gamma_{ow}$, and $\gamma_{oa}$ are air-water, oil-water, and oil-air interfacial tensions, respectively. If S>0 then the oil spreads on water surface, and if S<0, it confines into a droplet on the water surface. The water-air surface tension is ~72.8 mN/m, which is much larger than the sum of oil-air surface tension and oil-water IFT, and therefore S>0 which leads to spreading of oil. To facilitate either in-situ burning or safe removal of spilled crude oil on ocean surface, the spreading coefficient must be negative. The value of S<0 is achieved by addition of amphiphilic solutions that lower the air-water surface tension such that $\gamma_{aw}<(\gamma_{ow}+\gamma_{oa})$. Herein, a mixture of aqueous lignin NP dispersion with 1-pentanol is proposed as an eco-friendly solution to achieve a negative spreading coefficient and confining spilled oil into a thick slick.

Figure 16:
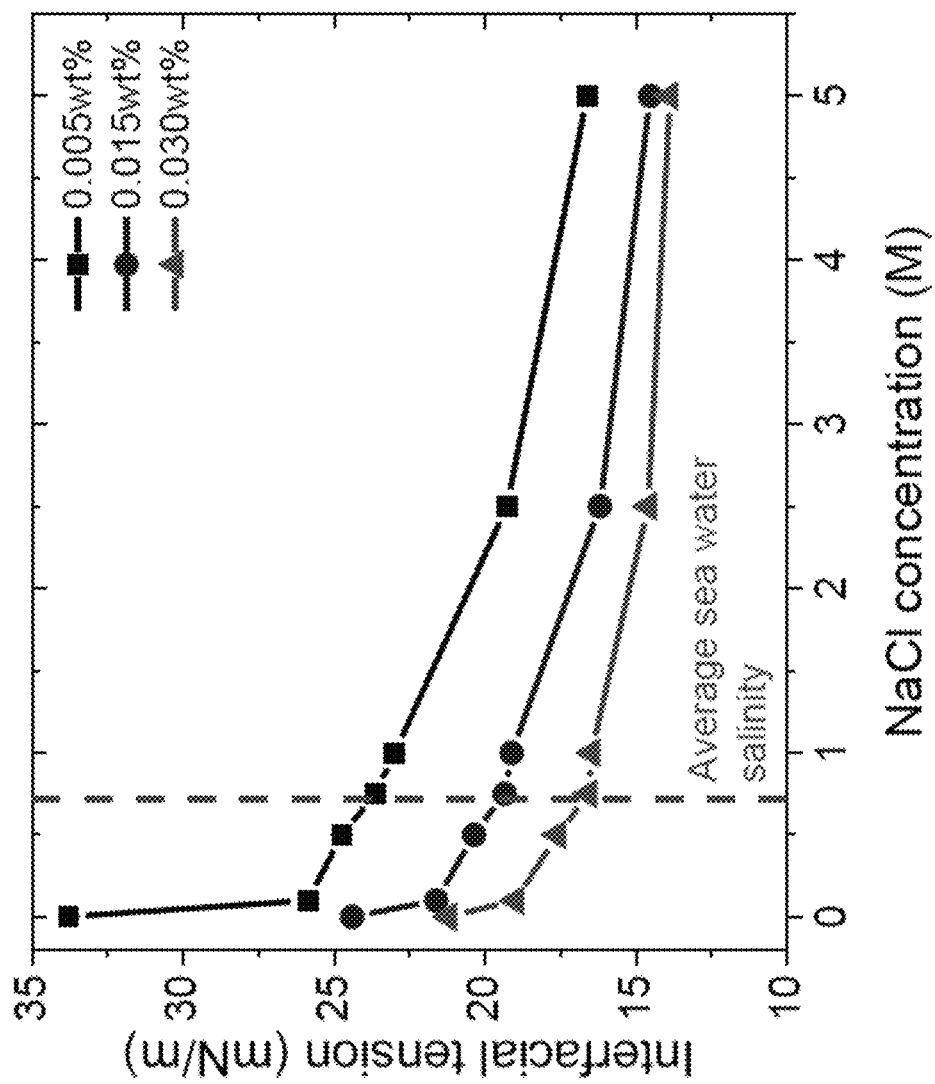
FIG. 16 depicts the effect of salt water on interfacial tension.

The interfacial tension of the oil-water interface is affected by salt (FIG. 16). The equilibrium interfacial tension between decane and the water containing lignin nanoparticles decreases with increasing concentration of salt in the aqueous phase. The interfacial tension between water containing 0.005 wt-% lignin nanoparticles and decane interfacial tension decreases from 34 mN/m to 17 mN/m upon increasing the NaCl concentration from 1 mM to 5000 mM. Upon increasing the lignin nanoparticle concentration to 0.030 wt-%, the interfacial tension decreases further from 21 mN/m to 14 mN/m when the salinity is increased from 1 mM to 5000 mM. The observed decrease in surface tension with increasing amount of salt is attributed to the screening of electrostatic repulsions between (a) lignin nanoparticles pre-adsorbed at the interface, and (b) negatively charged oil-water interface and unabsorbed lignin nanoparticles in bulk. The screening of electrostatic repulsions will induce a higher degree of nanoparticle-adsorption at the oil-water interface, and thus larger reduction in the interfacial tension.

The oil-herding ability of a 9:1 mixture of 0.25 mg/ml lignin NP and 1-pentanol was investigated on a lab-scale. In the absence of lignin NPs, 1-pentanol reduced the surface area instantaneously, but the confined oil re-spread within 5 minutes (FIG. 17B and FIG. 18A). Only lignin NP solution remained ineffective and no crude oil surface area decrease was observed (FIG. 17A and FIG. 18).

Figure 19:
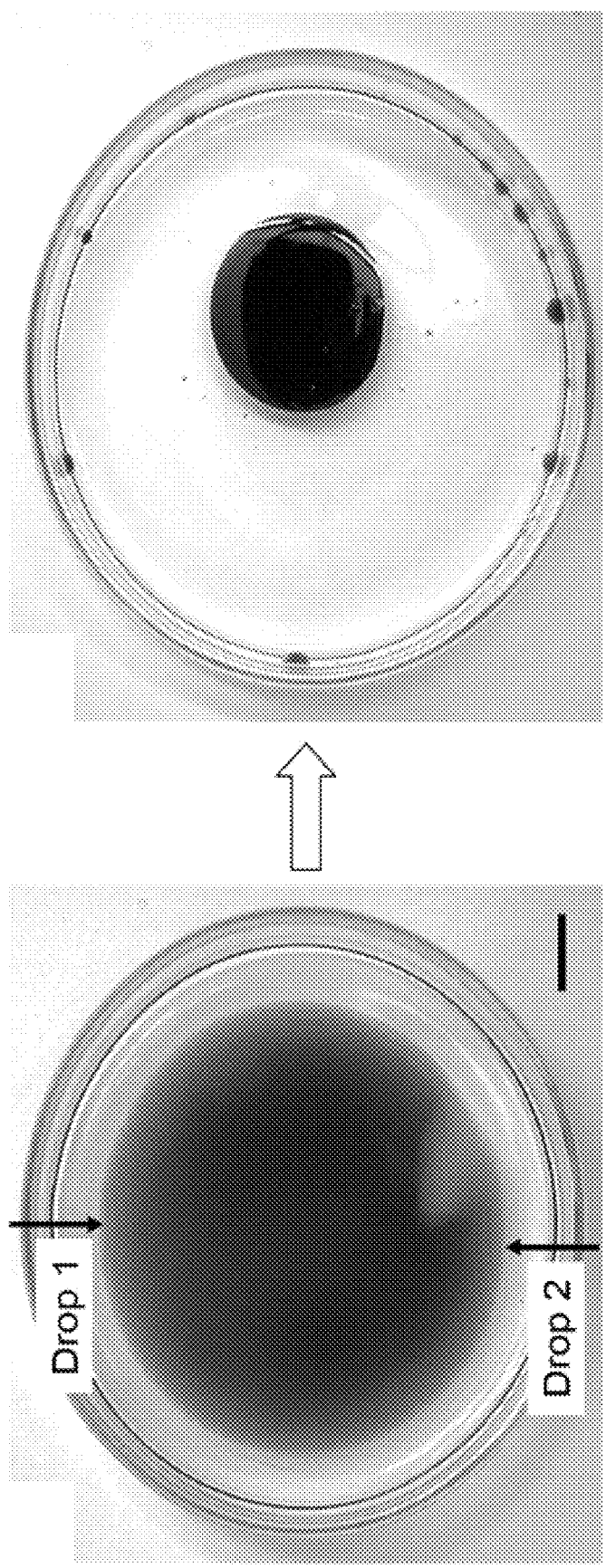
FIG. 19 depicts images showing herding process by adding two droplets of lignin NPs-pentanol mixture from the directions indicated by the arrows. The herded oil slick is at the center of petri dish due to the Marangoni flow and interfacial mass transfer generated by two droplets. Scale bar=1 cm.
Figure 20:
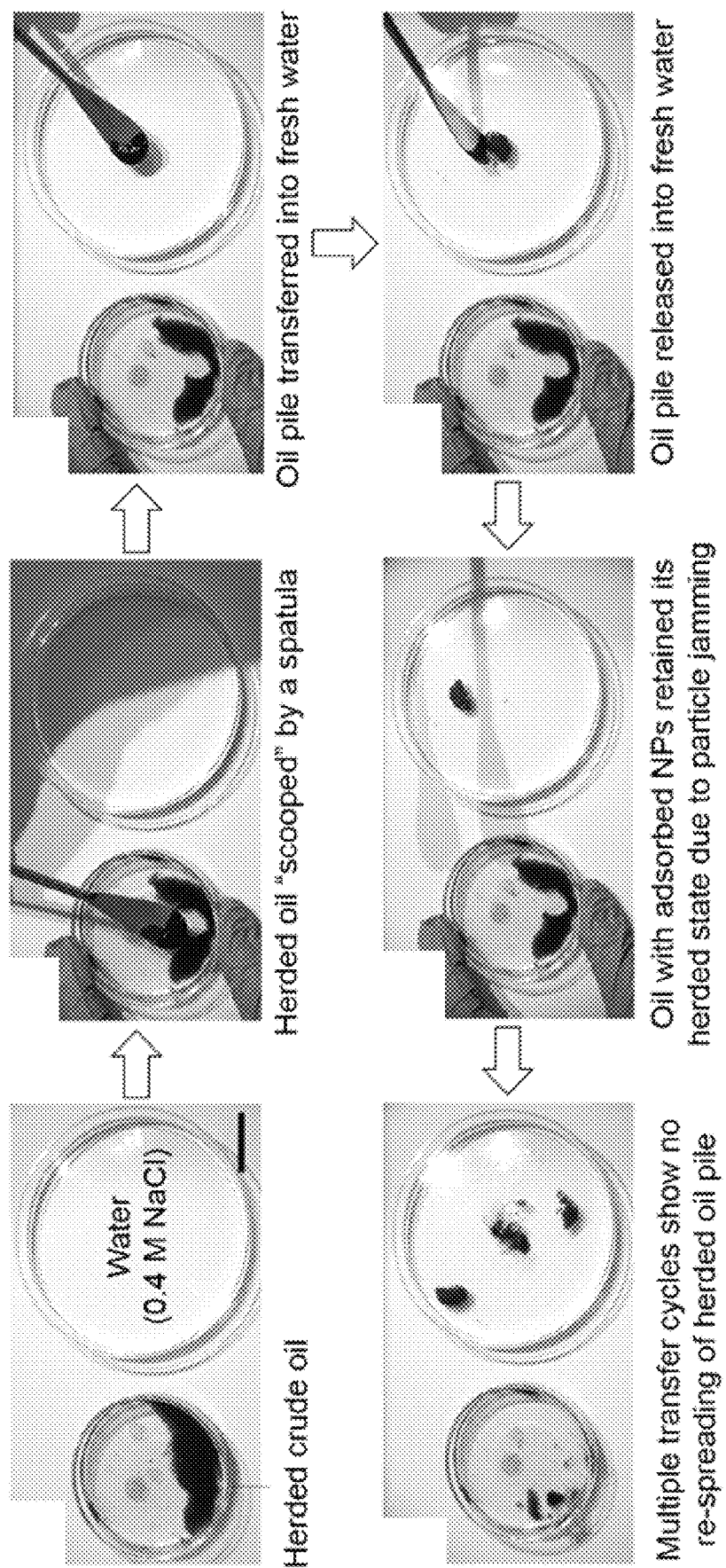
FIG. 20 depicts a sequence of images showing the transfer of herded oil slick into fresh water surface contained in a Petri dish. The crude oil herded with lignin NPs-pentanol mixture retained its herded state on the fresh water surface. This ability to retain droplet shape highlights that the lignin NPs are irreversibly adsorbed on to the interface, which further restrict re-spreading of the oil onto water surface. Scale bar=2 cm.

Addition of a droplet of premixed solution of lignin NPs and 1-pentanol showed a rapid decrease in the surface area covered by the crude oil. A near-equilibrium state of oil coverage was attained after 3 seconds (FIG. 17C, FIG. 18A, and FIG. 19). The confined state of the crude oil was retained for several hours. The herded oil is removed from the water surface using a spatula (FIG. 17C). It was found that the herded crude oil retained a thick slick profile upon its addition onto fresh water surface (FIG. 20). This lack of spreading of the herded crude oil is due to irreversible binding of nanoparticles to the oil-water interface and highlights the unique ability of lignin NPs-pentanol mixture to impart long-term stability to the oil-slicks.

The crude oil herding process by lignin-pentanol mixture occurred as a dual step process. First, pentanol (or another heavy alcohol) instantaneously generates a Marangoni flow at the oil-water interface which confines the oil. The Marangoni flow is generated due to a difference in the surface tension of water and pentanol. Upon the addition of low surface tension (and low density) pentanol, interfacial mass transfer occurs away from the droplet towards the water region, which has high surface tension. This phenomenon makes the spreading coefficient S<0, and drives the initial oil herding process (Fanton, X. et al, Langmuir, 1998, 14:2554-2561; Zhang, L. et al., Langmuir, 2017, 33:12609-12615; Zhoa, G. et al., J. Phys. Chem. B, 2012, 116:10960-10963). In the second step, the lignin NPs adsorb onto oil-water interface and restricting the re-spreading of oil (FIG. 8), which otherwise is not observed for pentanol alone. The pentanol solubilizes within the initial few minutes, while allowing the relatively slow interfacial binding process of lignin NPs to complete. A small increase in the surface area of the crude oil was seen after the initial 5 minutes. This increase is attributed to completion of solubilization of the pentanol in water and crude oil. After complete solubilization of the pentanol, the spreading coefficient S>0 (see Materials and Methods section for calculations), which drives the stretching of the oil on water. This mode of mechanical deformation of the interface induces a compressive stress in the direction normal to the plane formed by three-phase contact lines. This compression normal to the three-phase contact line drives jamming of lignin NPs at the oil-water interface (Subramaniam, A. B. et al, Nat. Mater., 2005, 4:553-556; Herzig, E. M. et al., Nat. Mater., 2007, 6:966-971; Cheng, H. L. et al., Langmuir, 2009, 25:4412-4420; Jiang, Y. et al., Appl. Mater. Interfaces, 2017, 9:33327-33332) and induces film formation, which further restricts re-spreading of the oil despite S>0.

The oil herding efficiency of lignin NP-pentanol is dependent on the concentration of the particles and fraction of 1-pentanol in the mixture. The effect that the fraction of pentanol in the mixture has on the final herded state of the crude oil was investigated. Oil-herding tests were performed with a fixed concentration of lignin NPs (here 0.25 mg/ml) in the mixture and only varying the amount of 1-pentanol. The experiments with an increasing fraction of pentanol show an initial decrease followed by an increase in the surface area occupied by the crude oil (FIG. 21A). The maximum oil herding ability is observed for the mixture containing 10-20% of pentanol by volume. At a high fraction of pentanol in the mixture (i.e. >40%), the effective concentration of nanoparticles decreases, which restricts the stabilization of the oil-water interface. At a low fraction of 1-pentanol (i.e. <10%), the alcohol did not initiate a Marangoni flow and corresponding decrease in the surface area of the crude oil, making the herder inefficient. Additionally, the optimum lignin NP concentration in 1-pentanol was determined for the most efficient herding. In experiments with 0.5 ml of crude oil, it was found that an increase in the amount lignin NPs decreases the equilibrium area of the herded oil (FIG. 21B). The results showed that 5 mg of net lignin NP weight reduces the surface area of the spilled oil to 20% of its initial state. These initial experiments show that increasing the lignin nanoparticle concentration alters the viscoelastic properties of the herded oil (not shown here), which would affect the mechanical recovery process of the oil. Further studies would be necessary to understand the effect of lignin NPs on viscoelastic properties and gelation of oil, effect of movement of water (e.g. waves) on the herding efficiency and fate of the particles in the environment before any pilot-scale applications.

In summary, the concept of "benign-by-design" was applied to provide a new ecofriendly alternative to commercially used non-biodegradable oil-herders. It was found that lignin NPs readily adsorbed onto the oil-water interface and significantly decreased the interfacial tension. The affinity of the particles for the interface and interparticle interactions drove the formation of a robust interfacial film. Based on these fundamental characteristics of the lignin NPs, a 9:1 mixture of the lignin NPs with 1-pentanol is proposed for use as a new class of ecofriendly oil-herder. The mixture provides highly desired long-term stability to the confined crude oil by a thick film formation and facilitates its safe removal. The study lays a foundation for using lignin-based nanomaterials for oil-herding applications, thus providing an environmentally compatible material for oil spill recovery.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

We claim:

1. A method of adsorbing lignin onto a petrochemical oil, the method comprising:
   providing a solution of lignin nanoparticles in an alcohol;
   providing an oil on a liquid surface;
   contacting the oil with the solution of lignin nanoparticles in an alcohol;
   adsorbing the lignin nanoparticles onto the oil; and
   removing the adsorbed oil from the liquid surface.

2. The method of claim 1, wherein the lignin nanoparticles have an average diameter between 35 nm and 260 nm.

3. The method of claim 1, wherein the step of contacting the oil with a solution of lignin nanoparticles in an alcohol further comprises contacting the oil with an additional additive selected from the group consisting of: bioremediation agents, dispersants, surface collecting agents, and surface washing agents.

4. The method of claim 1, wherein the step of contacting the oil with a solution of lignin nanoparticles in an alcohol further comprises the step of decreasing the interfacial tension between the liquid surface and air.

5. The method of claim 1, wherein the liquid is selected from the group consisting of: freshwater, salt water, distilled water, deionized water, and brackish water.

6. The method of claim 1, wherein the alcohol is selected from the group consisting of: n-butanol, sec-butanol, isobutanol, tert-butanol, 1-pentanol, 2-pentanol, 3-pentanol, 2-methyl-1-butanol, 3-methyl-1-butanol, 3-methyl-2-butanol, 2,2-dimethyl-1-propanol, 1-hexanol, 2-hexanol, 3-hexanol, 2-methylpentan-1-ol, 3-methylpentan-1-ol, 4-methylpentan-1-ol, 2-methylpentan-2-ol, 3-methylpentan-2-ol, 4-methylpentan-2-ol, 2-methylpentan-3-ol, 3-methylpentan-3-ol, 2,2-dimethylbutan-1-ol, 2,3-dimethylbutan-1-ol, 3,3-dimethylbutan-1-ol, 2,3-dimethylbutan-2-ol, 3,3-dimethylbutan-2-ol, 2-ethylbutan-1-ol, 1-octanol, 2-octanol, 2-ethylhexanol, and combinations thereof.

7. The method of claim 1, wherein the petrochemical oil is selected from the group consisting of: fuel oil, crude oil, kerosene, gasoline, and combinations thereof.

8. The method of claim 1, wherein the concentration of lignin nanoparticles in an alcohol is between 0.2 mg/ml and 0.3 mg/ml.

9. The method of claim 1, wherein the step of adsorbing the lignin nanoparticles onto the oil takes between 0 minutes and 2 hours.

* * * * *